US011561879B2

(12) United States Patent
Haramaty-Krasne et al.

(10) Patent No.: US 11,561,879 B2
(45) Date of Patent: Jan. 24, 2023

(54) CONTENT ITEM SELECTION AND CLICK PROBABILITY DETERMINATION BASED UPON ACCIDENTAL CLICK EVENTS

(71) Applicant: Verizon Media Inc., New York, NY (US)

(72) Inventors: Naama Haramaty-Krasne, Hapekan (IL); Yohay Kaplan, Haifa (IL); Oren Shlomo Somekh, Kfar-Neter (IL); Alexander Shtoff, Haifa (IL)

(73) Assignee: YAHOO AD TECH LLC, Dulles, VA (US)

( * ) Notice: Subject to any disclaimer, the term of this patent is extended or adjusted under 35 U.S.C. 154(b) by 0 days.

(21) Appl. No.: 17/346,339

(22) Filed: Jun. 14, 2021

(65) Prior Publication Data
US 2022/0398180 A1    Dec. 15, 2022

(51) Int. Cl.
*G06F 3/04842* (2022.01)
*G06F 11/34* (2006.01)
*G06N 20/00* (2019.01)
*G06F 16/95* (2019.01)

(52) U.S. Cl.
CPC ...... *G06F 11/3438* (2013.01); *G06F 3/04842* (2013.01); *G06F 16/95* (2019.01); *G06N 20/00* (2019.01)

(58) Field of Classification Search
CPC .. G06F 11/3438; G06F 16/95; G06F 3/04842; G06N 20/00
See application file for complete search history.

(56) References Cited

U.S. PATENT DOCUMENTS

| 2022/0019689 | A1* | 1/2022 | Lau | G06F 21/6245 |
|---|---|---|---|---|
| 2022/0092645 | A1* | 3/2022 | Pan | G06Q 30/0275 |
| 2022/0245713 | A1* | 8/2022 | Bathe | G06Q 30/0631 |
| 2022/0253647 | A1* | 8/2022 | Perkins | G06N 20/20 |

OTHER PUBLICATIONS

Shan Zhong et al., An Adaptive Similarity-Measuring-Based CMAB Model for Recommendation System, Jan. 1, 2020, IEEE Access, vol. 8, pp. 42550-42561 (Year: 2020).*
Tae Sata et al., Recommender System By Grasping Individual Preference and Influence from other users, Aug. 1, 2013, IEEE Xplore, pp. 1345-1351 (Year: 2013).*

* cited by examiner

*Primary Examiner* — Tam T Tran
(74) *Attorney, Agent, or Firm* — Cooper Legal Group LLC

(57) ABSTRACT

In an example, sets of event information associated with events may be identified. The events may include intentional click events, accidental click events and/or skip events. Accidental click probabilities associated with the accidental click events and/or the skip events may be determined. Machine learning model training may be performed, using the sets of event information associated with the events and labels associated with the events, to generate a first machine learning model. The labels may include second labels associated with the intentional click events and/or third labels associated with the accidental click events and/or the skip events. The second labels may correspond to an intentional click classification. The third labels may be based upon the accidental click probabilities. Click probabilities associated with content items may be determined using the first machine learning model. A content item may be selected for presentation via a client device based upon the click probabilities.

20 Claims, 18 Drawing Sheets

CONTENT ITEM SELECTION AND CLICK PROBABILITY DETERMINATION BASED UPON ACCIDENTAL CLICK EVENTS

BACKGROUND

Many services, such as websites, applications, etc. may provide platforms for viewing media. For example, a user may interact with a service. While interacting with the service, selected media may be presented to the user automatically. Some of the media may be advertisements advertising products and/or services associated with a company.

SUMMARY

In accordance with the present disclosure, one or more computing devices and/or methods are provided. In an example, a first plurality of sets of event information, associated with a first plurality of events, may be identified. The first plurality of sets of event information may comprise a second plurality of sets of event information associated with a plurality of intentional click events of the first plurality of events, a third plurality of sets of event information associated with a plurality of accidental click events of the first plurality of events and a fourth plurality of sets of event information associated with a plurality of skip events of the first plurality of events. An accidental click event of the plurality of accidental click events may correspond to an event in which a content item is presented via a client device and a selection (e.g., a click) of the content item is received via the client device, where the selection is determined (e.g., predicted) to be accidental. A plurality of accidental click probabilities associated with a second plurality of events may be determined. The second plurality of events may comprise the plurality of accidental click events and the plurality of skip events. A first accidental click probability of the plurality of accidental click probabilities may be associated with a first accidental click event of the plurality of accidental click events. The first accidental click probability may be determined based upon a first set of event information associated with the first accidental click event. A second accidental click probability of the plurality of accidental click probabilities may be associated with a first skip event of the plurality of skip events. The second accidental click probability may be determined based upon a second set of event information associated with the first skip event. Machine learning model training may be performed, using the first plurality of sets of event information associated with the first plurality of events and a first plurality of labels associated with the first plurality of events, to generate a first machine learning model. The first plurality of labels may comprise a second plurality of labels associated with the plurality of intentional click events and a third plurality of labels associated with the second plurality of events. Labels of the second plurality of labels may correspond to an intentional click classification. Labels of the third plurality of labels may be based upon the plurality of accidental click probabilities. The third plurality of labels may comprise a first label, associated with the first accidental click event, based upon the first accidental click probability. The third plurality of labels may comprise a second label, associated with the first skip event, based upon the second accidental click probability. A request for content associated with a client device may be received. A plurality of click probabilities associated with a plurality of content items may be determined using the first machine learning model in response to receiving the request for content. A first content item of the plurality of content items may be selected for presentation via the client device based upon the plurality of click probabilities.

In an example, a first plurality of sets of event information, associated with a first plurality of events, may be identified. The first plurality of sets of event information may comprise a second plurality of sets of event information associated with a plurality of intentional click events of the first plurality of events and a third plurality of sets of event information associated with a plurality of skip events of the first plurality of events. A plurality of accidental click probabilities associated with the plurality of skip events may be determined. A first accidental click probability of the plurality of accidental click probabilities may be associated with a first skip event of the plurality of skip events. The first accidental click probability may be determined based upon a first set of event information associated with the first skip event. Machine learning model training may be performed, using the first plurality of sets of event information associated with the first plurality of events and a first plurality of labels associated with the first plurality of events, to generate a first machine learning model. The first plurality of labels may comprise a second plurality of labels associated with the plurality of intentional click events and a third plurality of labels associated with the plurality of skip events. Labels of the second plurality of labels may correspond to an intentional click classification. Labels of the third plurality of labels may be based upon the plurality of accidental click probabilities. The third plurality of labels may comprise a first label, associated with the first skip event, based upon the first accidental click probability. A request for content associated with a client device may be received. A plurality of click probabilities associated with a plurality of content items may be determined using the first machine learning model in response to receiving the request for content. A first content item of the plurality of content items may be selected for presentation via the client device based upon the plurality of click probabilities.

In an example, a first plurality of sets of event information, associated with a first plurality of events, may be identified. The first plurality of sets of event information may comprise a second plurality of sets of event information associated with a plurality of intentional click events of the first plurality of events and a third plurality of sets of event information associated with a plurality of accidental click events of the first plurality of events. A plurality of accidental click probabilities associated with the plurality of accidental click events may be determined. A first accidental click probability of the plurality of accidental click probabilities may be associated with a first accidental click event of the plurality of accidental click events. The first accidental click probability may be determined based upon a first set of event information associated with the first accidental click event. Machine learning model training may be performed, using the first plurality of sets of event information associated with the first plurality of events and a first plurality of labels associated with the first plurality of events, to generate a first machine learning model. The first plurality of labels may comprise a second plurality of labels associated with the plurality of intentional click events and a third plurality of labels associated with the plurality of accidental click events. Labels of the second plurality of labels may correspond to an intentional click classification. Labels of the third plurality of labels may be based upon the plurality of accidental click probabilities. The third plurality of labels may comprise a first label, associated with the first accidental click event, based upon the first accidental click probability. A request for content associated with a client device may be received. A plurality of click probabilities associated with a plurality of content items may be determined using the first machine learning model in response to receiving the request for content. A first content item of the plurality of content items may be selected for presentation via the client device based upon the plurality of click probabilities.

DESCRIPTION OF THE DRAWINGS

While the techniques presented herein may be embodied in alternative forms, the particular embodiments illustrated in the drawings are only a few examples that are supplemental of the description provided herein. These embodiments are not to be interpreted in a limiting manner, such as limiting the claims appended hereto.

DETAILED DESCRIPTION

Subject matter will now be described more fully hereinafter with reference to the accompanying drawings, which form a part hereof, and which show, by way of illustration, specific example embodiments. This description is not intended as an extensive or detailed discussion of known concepts. Details that are known generally to those of ordinary skill in the relevant art may have been omitted, or may be handled in summary fashion.

The following subject matter may be embodied in a variety of different forms, such as methods, devices, components, and/or systems. Accordingly, this subject matter is not intended to be construed as limited to any example embodiments set forth herein. Rather, example embodiments are provided merely to be illustrative. Such embodiments may, for example, take the form of hardware, software, firmware or any combination thereof.

1. Computing Scenario

The following provides a discussion of some types of computing scenarios in which the disclosed subject matter may be utilized and/or implemented.

1.1. Networking

Figure 1:
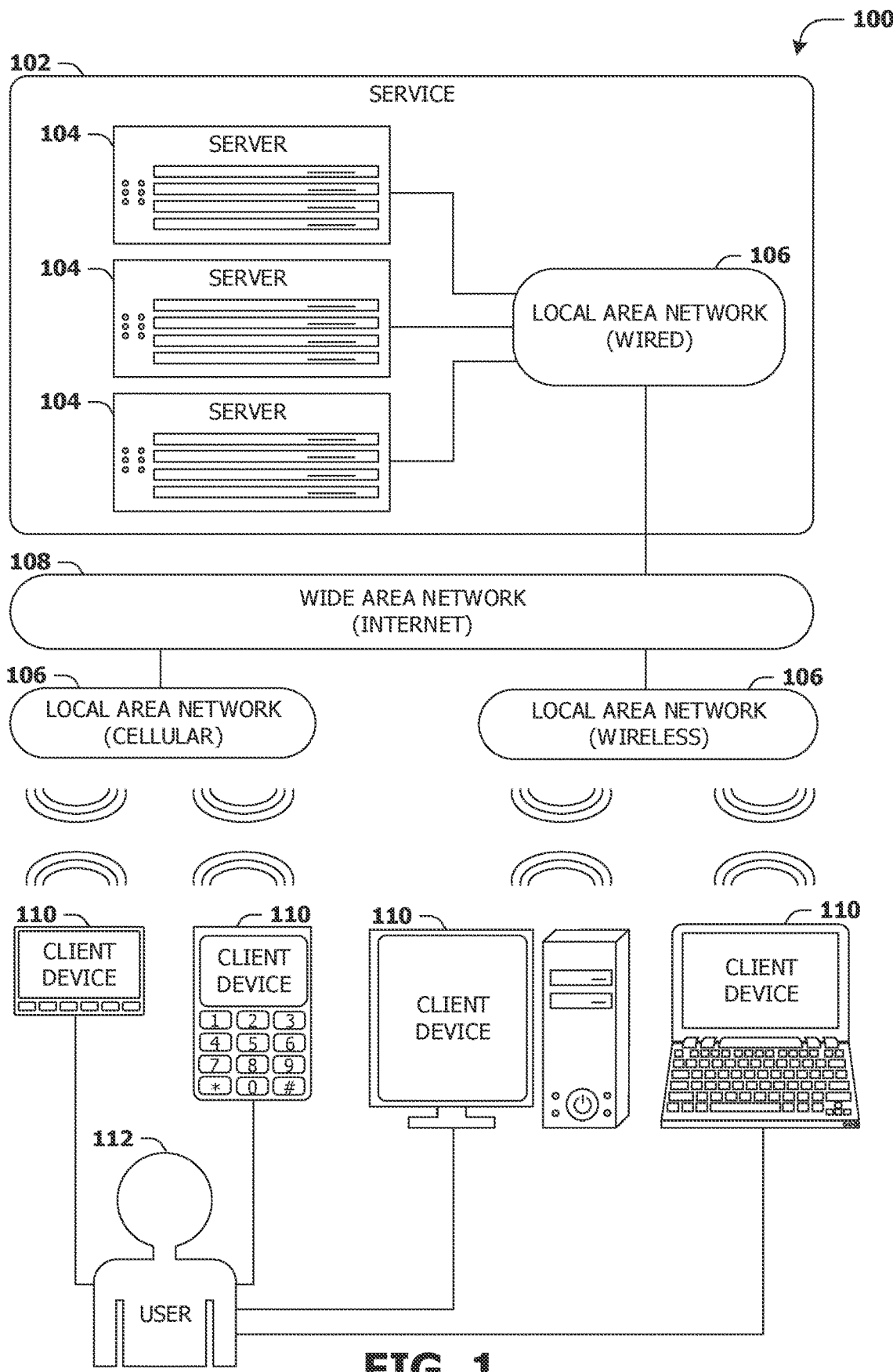
FIG. 1 is an illustration of a scenario involving various examples of networks that may connect servers and clients.

FIG. 1 is an interaction diagram of a scenario 100 illustrating a service 102 provided by a set of servers 104 to a set of client devices 110 via various types of networks. The servers 104 and/or client devices 110 may be capable of transmitting, receiving, processing, and/or storing many types of signals, such as in memory as physical memory states.

The servers 104 of the service 102 may be internally connected via a local area network 106 (LAN), such as a wired network where network adapters on the respective servers 104 are interconnected via cables (e.g., coaxial and/or fiber optic cabling), and may be connected in various topologies (e.g., buses, token rings, meshes, and/or trees). The servers 104 may be interconnected directly, or through one or more other networking devices, such as routers, switches, and/or repeaters. The servers 104 may utilize a variety of physical networking protocols (e.g., Ethernet and/or Fiber Channel) and/or logical networking protocols (e.g., variants of an Internet Protocol (IP), a Transmission Control Protocol (TCP), and/or a User Datagram Protocol (UDP). The local area network 106 may include, e.g., analog telephone lines, such as a twisted wire pair, a coaxial cable, full or fractional digital lines including T1, T2, T3, or T4 type lines, Integrated Services Digital Networks (ISDNs), Digital Subscriber Lines (DSLs), wireless links including satellite links, or other communication links or channels, such as may be known to those skilled in the art. The local area network 106 may be organized according to one or more network architectures, such as server/client, peer-to-peer, and/or mesh architectures, and/or a variety of roles, such as administrative servers, authentication servers, security monitor servers, data stores for objects such as files and databases, business logic servers, time synchronization servers, and/or front-end servers providing a user-facing interface for the service 102.

Likewise, the local area network 106 may comprise one or more sub-networks, such as may employ differing architectures, may be compliant or compatible with differing protocols and/or may interoperate within the local area network 106. Additionally, a variety of local area networks 106 may be interconnected; e.g., a router may provide a link between otherwise separate and independent local area networks 106.

In the scenario 100 of FIG. 1, the local area network 106 of the service 102 is connected to a wide area network 108 (WAN) that allows the service 102 to exchange data with other services 102 and/or client devices 110. The wide area network 108 may encompass various combinations of devices with varying levels of distribution and exposure, such as a public wide-area network (e.g., the Internet) and/or a private network (e.g., a virtual private network (VPN) of a distributed enterprise).

In the scenario 100 of FIG. 1, the service 102 may be accessed via the wide area network 108 by a user 112 of one or more client devices 110, such as a portable media player (e.g., an electronic text reader, an audio device, or a portable gaming, exercise, or navigation device); a portable communication device (e.g., a camera, a phone, a wearable or a text chatting device); a workstation; and/or a laptop form factor computer. The respective client devices 110 may communicate with the service 102 via various connections to the wide area network 108. As a first such example, one or more client devices 110 may comprise a cellular communicator and may communicate with the service 102 by connecting to the wide area network 108 via a wireless local area network 106 provided by a cellular provider. As a second such example, one or more client devices 110 may communicate with the service 102 by connecting to the wide area network 108 via a wireless local area network 106 (and/or via a wired network) provided by a location such as the user's home or workplace (e.g., a WiFi (Institute of Electrical and Electronics Engineers (IEEE) Standard 802.11) network or a Bluetooth (IEEE Standard 802.15.1) personal area network). In this manner, the servers 104 and the client devices 110 may communicate over various types of networks. Other types of networks that may be accessed by the servers 104 and/or client devices 110 include mass storage, such as network attached storage (NAS), a storage area network (SAN), or other forms of computer or machine readable media.

1.2. Server Configuration

Figure 2:
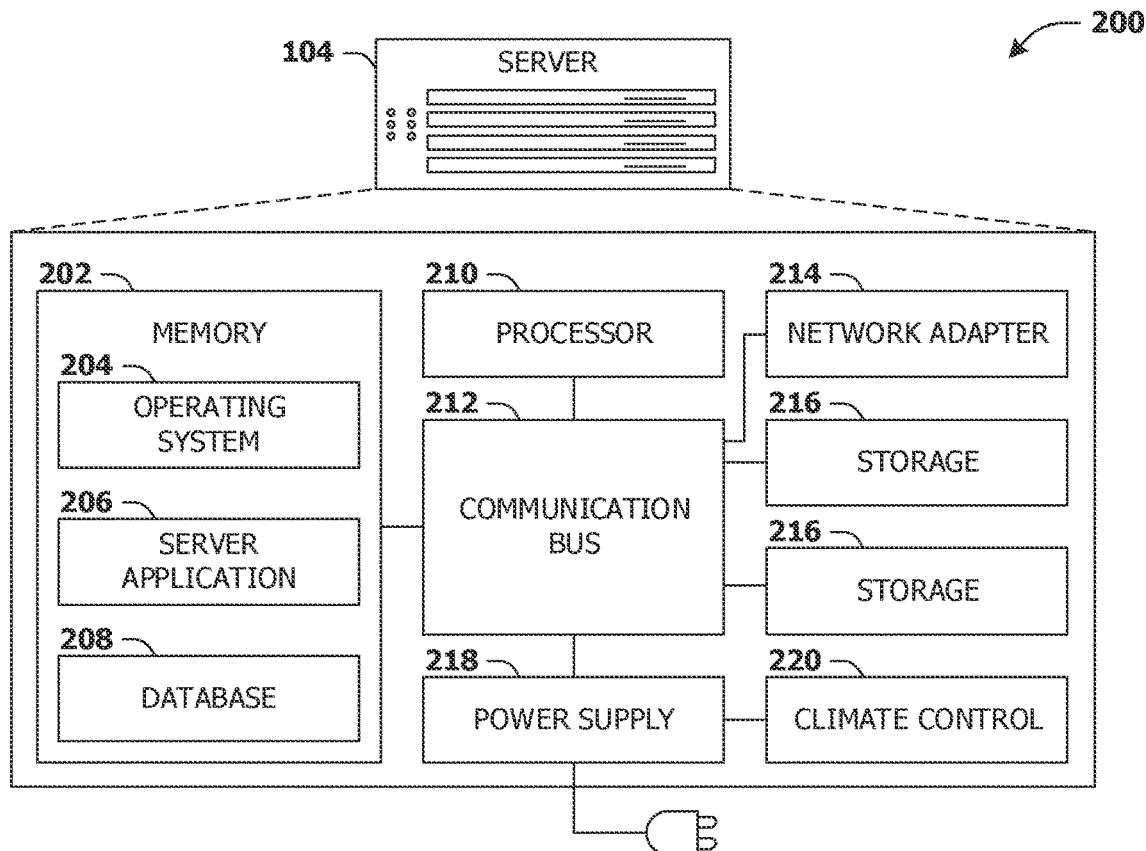
FIG. 2 is an illustration of a scenario involving an example configuration of a server that may utilize and/or implement at least a portion of the techniques presented herein.

FIG. 2 presents a schematic architecture diagram 200 of a server 104 that may utilize at least a portion of the techniques provided herein. Such a server 104 may vary widely in configuration or capabilities, alone or in conjunction with other servers, in order to provide a service such as the service 102.

The server 104 may comprise one or more processors 210 that process instructions. The one or more processors 210 may optionally include a plurality of cores; one or more coprocessors, such as a mathematics coprocessor or an integrated graphical processing unit (GPU); and/or one or more layers of local cache memory. The server 104 may comprise memory 202 storing various forms of applications, such as an operating system 204; one or more server applications 206, such as a hypertext transport protocol (HTTP) server, a file transfer protocol (FTP) server, or a simple mail transport protocol (SMTP) server; and/or various forms of data, such as a database 208 or a file system. The server 104 may comprise a variety of peripheral components, such as a wired and/or wireless network adapter 214 connectible to a local area network and/or wide area network; one or more storage components 216, such as a hard disk drive, a solid-state storage device (SSD), a flash memory device, and/or a magnetic and/or optical disk reader.

The server 104 may comprise a mainboard featuring one or more communication buses 212 that interconnect the processor 210, the memory 202, and various peripherals, using a variety of bus technologies, such as a variant of a serial or parallel AT Attachment (ATA) bus protocol; a Uniform Serial Bus (USB) protocol; and/or Small Computer System Interface (SCI) bus protocol. In a multibus scenario, a communication bus 212 may interconnect the server 104 with at least one other server. Other components that may optionally be included with the server 104 (though not shown in the schematic diagram 200 of FIG. 2) include a display; a display adapter, such as a graphical processing unit (GPU); input peripherals, such as a keyboard and/or mouse; and a flash memory device that may store a basic input/output system (BIOS) routine that facilitates booting the server 104 to a state of readiness.

The server 104 may operate in various physical enclosures, such as a desktop or tower, and/or may be integrated with a display as an "all-in-one" device. The server 104 may be mounted horizontally and/or in a cabinet or rack, and/or may simply comprise an interconnected set of components. The server 104 may comprise a dedicated and/or shared power supply 218 that supplies and/or regulates power for the other components. The server 104 may provide power to and/or receive power from another server and/or other devices. The server 104 may comprise a shared and/or dedicated climate control unit 220 that regulates climate properties, such as temperature, humidity, and/or airflow. Many such servers 104 may be configured and/or adapted to utilize at least a portion of the techniques presented herein.

1.3. Client Device Configuration

Figure 3:
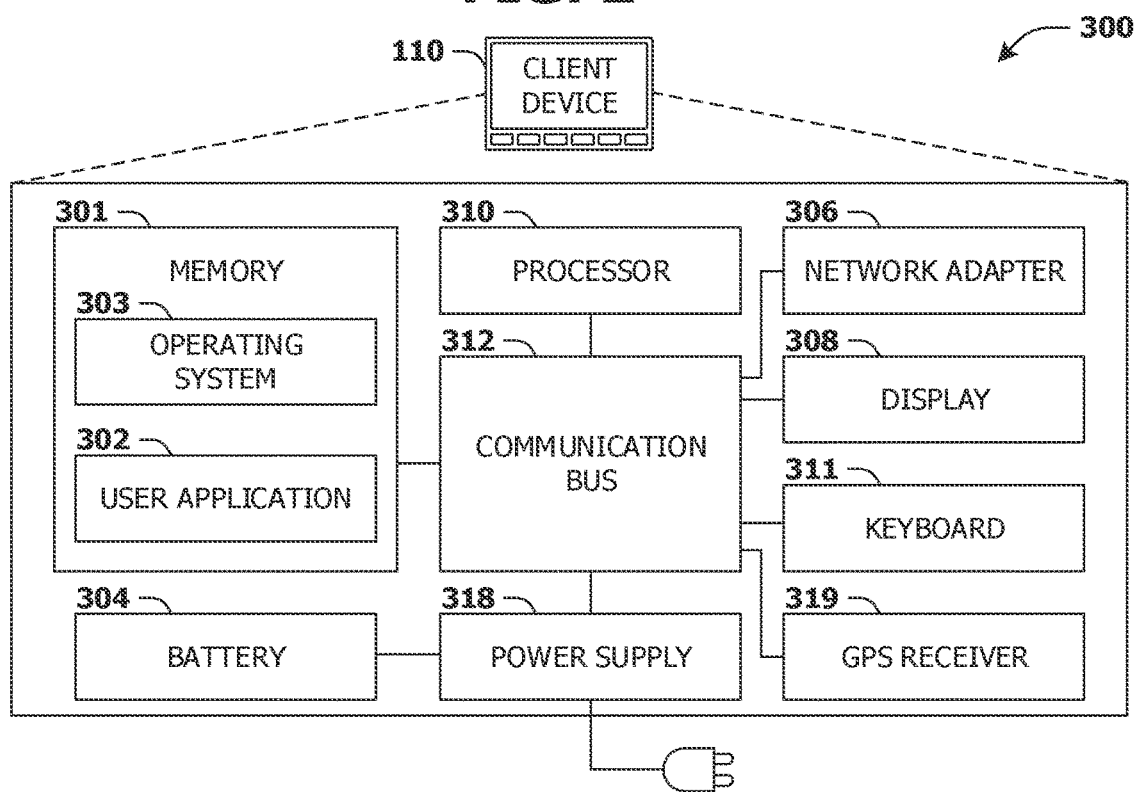
FIG. 3 is an illustration of a scenario involving an example configuration of a client that may utilize and/or implement at least a portion of the techniques presented herein.

FIG. 3 presents a schematic architecture diagram 300 of a client device 110 whereupon at least a portion of the techniques presented herein may be implemented. Such a client device 110 may vary widely in configuration or capabilities, in order to provide a variety of functionality to a user such as the user 112. The client device 110 may be provided in a variety of form factors, such as a desktop or tower workstation; an "all-in-one" device integrated with a display 308; a laptop, tablet, convertible tablet, or palmtop device; a wearable device mountable in a headset, eyeglass, earpiece, and/or wristwatch, and/or integrated with an article of clothing; and/or a component of a piece of furniture, such as a tabletop, and/or of another device, such as a vehicle or residence. The client device 110 may serve the user in a variety of roles, such as a workstation, kiosk, media player, gaming device, and/or appliance.

The client device 110 may comprise one or more processors 310 that process instructions. The one or more processors 310 may optionally include a plurality of cores; one or more coprocessors, such as a mathematics coprocessor or an integrated graphical processing unit (GPU); and/or one or more layers of local cache memory. The client device 110 may comprise memory 301 storing various forms of applications, such as an operating system 303; one or more user applications 302, such as document applications, media applications, file and/or data access applications, communication applications such as web browsers and/or email clients, utilities, and/or games; and/or drivers for various peripherals. The client device 110 may comprise a variety of peripheral components, such as a wired and/or wireless network adapter 306 connectible to a local area network and/or wide area network; one or more output components, such as a display 308 coupled with a display adapter (optionally including a graphical processing unit (GPU)), a sound adapter coupled with a speaker, and/or a printer; input devices for receiving input from the user, such as a keyboard 311, a mouse, a microphone, a camera, and/or a touch-sensitive component of the display 308; and/or environmental sensors, such as a global positioning system (GPS) receiver 319 that detects the location, velocity, and/or acceleration of the client device 110, a compass, accelerometer, and/or gyroscope that detects a physical orientation of the client device 110. Other components that may optionally be included with the client device 110 (though not shown in the schematic architecture diagram 300 of FIG. 3) include one or more storage components, such as a hard disk drive, a solid-state storage device (SSD), a flash memory device, and/or a magnetic and/or optical disk reader; and/or a flash memory device that may store a basic input/output system (BIOS) routine that facilitates booting the client device 110 to a state of readiness; and a climate control unit that regulates climate properties, such as temperature, humidity, and airflow.

The client device 110 may comprise a mainboard featuring one or more communication buses 312 that interconnect the processor 310, the memory 301, and various peripherals, using a variety of bus technologies, such as a variant of a serial or parallel AT Attachment (ATA) bus protocol; the Uniform Serial Bus (USB) protocol; and/or the Small Computer System Interface (SCI) bus protocol. The client device 110 may comprise a dedicated and/or shared power supply 318 that supplies and/or regulates power for other components, and/or a battery 304 that stores power for use while the client device 110 is not connected to a power source via the power supply 318. The client device 110 may provide power to and/or receive power from other client devices.

In some scenarios, as a user 112 interacts with a software application on a client device 110 (e.g., an instant messenger and/or electronic mail application), descriptive content in the form of signals or stored physical states within memory (e.g., an email address, instant messenger identifier, phone number, postal address, message content, date, and/or time) may be identified. Descriptive content may be stored, typically along with contextual content. For example, the source of a phone number (e.g., a communication received from another user via an instant messenger application) may be stored as contextual content associated with the phone number. Contextual content, therefore, may identify circumstances surrounding receipt of a phone number (e.g., the date or time that the phone number was received), and may be associated with descriptive content. Contextual content, may, for example, be used to subsequently search for associated descriptive content. For example, a search for phone numbers received from specific individuals, received via an instant messenger application or at a given date or time, may be initiated. The client device 110 may include one or more servers that may locally serve the client device 110 and/or other client devices of the user 112 and/or other individuals. For example, a locally installed webserver may provide web content in response to locally submitted web requests. Many such client devices 110 may be configured and/or adapted to utilize at least a portion of the techniques presented herein.

2. Presented Techniques

One or more computing devices and/or techniques for determining click probabilities associated with content items and/or selecting content for transmission to devices are provided. For example, a first user (and/or a first client device associated with the first user) may access and/or interact with a service, such as a browser, software, a website, an application, an operating system, etc. that provides a platform for viewing and/or downloading content from a server associated with a content system. In some examples, in response to receiving a request for content associated with the first client device, the content system may determine click probabilities associated with a plurality of content items (e.g., advertisements, images, links, videos, etc.). The click probabilities may be used to select a content item, from the plurality of content items, for presentation via the first client device. In some examples, a click probability is representative of (e.g., comprises) a probability of receiving a selection (e.g., a click) of a content item in response to presenting the content item via the first client device (e.g., a probability that presentation of the content item via the first client device would be followed by a selection, such as a click, of the content item on the first client device).

In some examples, the click probabilities may be determined based upon a first user profile associated with the first user and click events. The click events may correspond to selections of content items presented via client devices (e.g., the content items may be provided by the content system in response to requests for content). For example, a first click probability associated with presenting a first content item via the first client device may be determined based upon the first user profile, click events associated with the first content item and/or user profiles associated with users that performed the click events. The click events may comprise accidental click events. An accidental click event may correspond to a selection of a content item that is determined (e.g., predicted) to have been performed accidentally and/or unintentionally, such as when a user mistakenly clicks on an advertisement. An accidental click event may be detected and/or identified, such as using one or more of the techniques herein, based upon a dwell time associated with a selection of a content item (e.g., the accidental click event may be detected and/or identified based upon the dwell time being less than a threshold dwell time).

Some systems may not distinguish between the accidental click events and intentional click events when determining the first click probability. For example, the first click probability may be increased due to an assumed affinity and/or interest that the first user has towards the first content item that is assumed based upon the accidental click events associated with other users (e.g., other users with user profiles similar to the first user profile of the first user). Since selections (e.g., clicks) of the accidental click events may be unintentional, the accidental click events may not be reflective of an affinity and/or interest of the other users towards the first content item, and thus, the first click probability determined using these systems may be inaccurate. Alternatively and/or additionally, treating the intentional click events and the accidental click events in the same way in determining the first click probability may lead to an inaccurate determination of the first click probability. Accordingly, distinguishing between the accidental click events and the intentional click events (and/or using the accidental click events and the intentional click events in different ways) when determining the first click probability, such as using one or more of the techniques discussed herein, may lead to more accurate determination of the first click probability (e.g., a more accurate representation of a probability that the first content item is selected in response to presenting the first content item via the first client device).

Other systems may filter the accidental click events from click events used to determine the first click probability. For example, these systems may remove the accidental click events from data used to determine the first click probability, and/or may not account for the accidental click events and/or accidental click probabilities when determining the first click probability. The first click probability determined using these systems may be inaccurate, such as due to underprediction of click probabilities. For example, although an accidental click event may not indicate an affinity and/or interest of a user towards a content item, the accidental click event corresponds to a selection (e.g., a click) of a content item. Accordingly, determining accidental click probabilities and/or using the accidental click probabilities to determine the first click probability, such as using one or more of the techniques discussed herein, may lead to more accurate determination of the first click probability.

Thus, in accordance with one or more of the techniques presented herein, a first plurality of sets of event information, associated with a first plurality of events, may be identified. The first plurality of sets of event information may comprise a second plurality of sets of event information associated with a plurality of intentional click events of the first plurality of events, a third plurality of sets of event information associated with a plurality of accidental click events of the first plurality of events and/or a fourth plurality of sets of event information associated with a plurality of skip events of the first plurality of events. A plurality of accidental click probabilities associated with a second plurality of events may be determined. In some examples, the plurality of accidental click probabilities may be determined based upon events, such as accidental click events and/or skip events. For example, a first machine learning model may be trained using sets of event information associated with accidental click events and/or skip events, and/or the plurality of accidental click probabilities may be determined using the first machine learning model. The second plurality of events may comprise the plurality of accidental click events and/or the plurality of skip events. The plurality of accidental click probabilities may be determined based upon sets of event information, of the first plurality of sets of event information, associated with the second plurality of events. Machine learning model training may be performed, using the first plurality of sets of event information associated with the first plurality of events and a first plurality of labels associated with the first plurality of events, to generate a second machine learning model. The first plurality of labels may comprise a second plurality of labels associated with the plurality of intentional click events and a third plurality of labels associated with the second plurality of events. Labels of the second plurality of labels may correspond to an intentional click classification. Labels of the third plurality of labels may be based upon the plurality of accidental click probabilities. For example, a label (of the third plurality of labels) that is associated with an event of the second plurality of events may be determined based upon an accidental click probability, of the plurality of accidental click probabilities, associated with the event. In an example, the label may be indicative of a value that is equal to the accidental click probability. Alternatively and/or additionally, the label may be indicative of a value that is different than the accidental click probability (e.g., one or more operations, such as mathematical operations, may be performed using the accidental click probability and one or more other values to determine the value of the label). A request for content associated with a client device may be received. A plurality of click probabilities associated with a plurality of content items may be determined using the second machine learning model in response to receiving the request for content. A first content item of the plurality of content items may be selected for presentation via the client device based upon the plurality of click probabilities.

It may be appreciated that by determining click probabilities based upon accidental click probabilities, such as using one or more of the techniques herein, the click probabilities may be determined more accurately. Alternatively and/or additionally, by training the first machine learning model using labels that are based upon accidental click probabilities, the first machine learning model may be used to determine click probabilities with increased accuracy. For example, some systems may set labels associated with click events to a first value (e.g., 1) for use in training a machine learning model for determining click probabilities, regardless of whether the click events are accidental click events or intentional click events. By training the first machine learning model using training data that differentiates between accidental click events and intentional click events (e.g., by setting labels associated with intentional click events to a value corresponding to an intentional click classification, such as 1, and setting labels associated with accidental click events to values based upon the accidental click probabilities), in accordance with one or more embodiments of the present disclosure, click probabilities determined using the first machine learning model may have an increased accuracy as compared to the systems that set labels associated with click events to the first value regardless of whether the click events are accidental click events or intentional click events. Alternatively and/or additionally, by training the first machine learning model using training data that comprises labels associated with skip events that are based upon accidental click probabilities associated with the skip events, in accordance with one or more embodiments of the present disclosure, click probabilities determined using the first machine learning model may have an increased accuracy as compared to systems that set labels associated with skip events to a single value (e.g., 0) for training a machine learning model.

Figure 4:
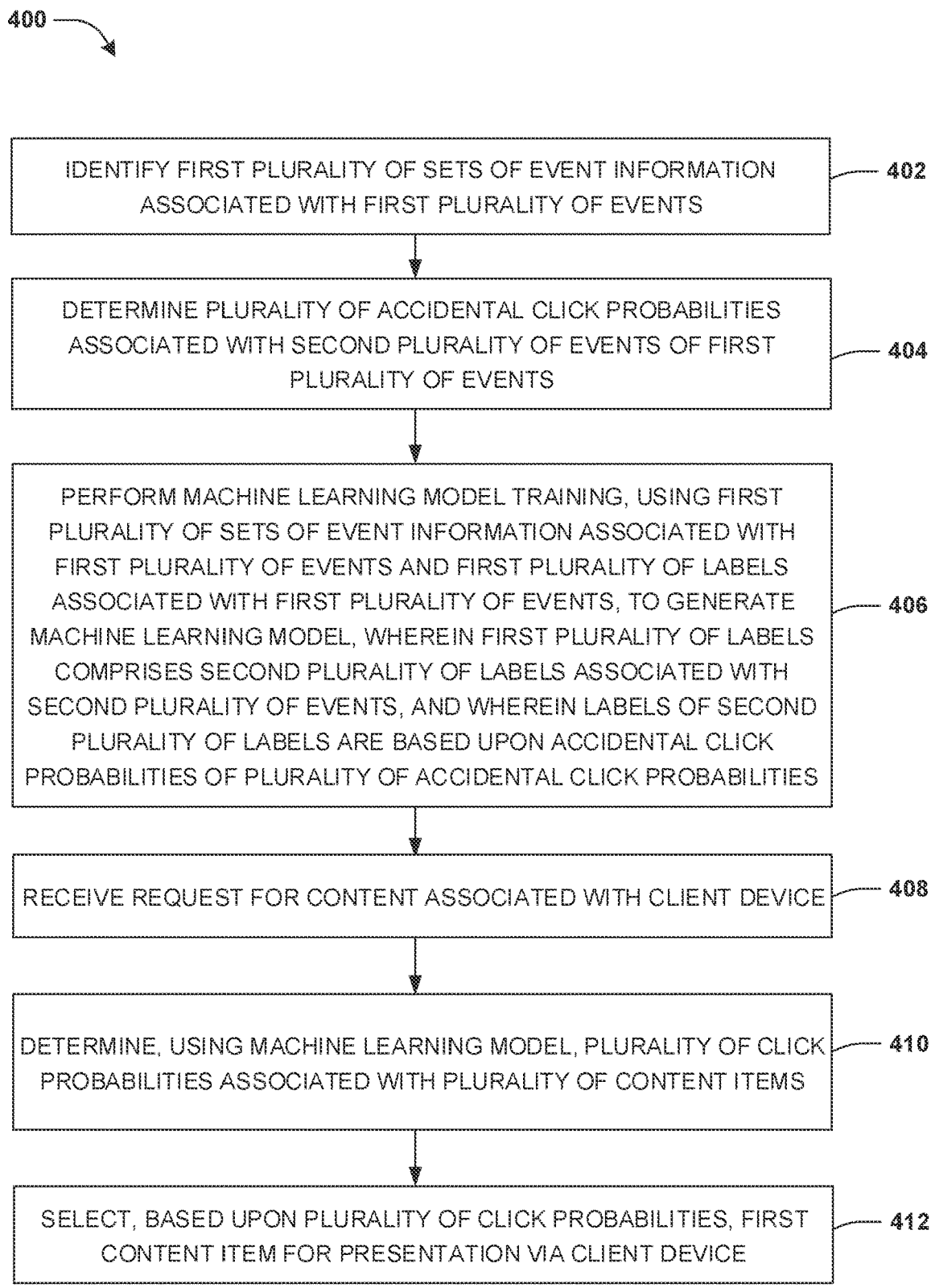
FIG. 4 is a flow chart illustrating an example method for determining click probabilities associated with content items and/or selecting content for transmission to devices.

An embodiment of determining click probabilities associated with content items and/or selecting content for transmission to devices is illustrated by an example method 400 of FIG. 4. A content system for presenting content via devices may be provided. In some examples, the content system may be an advertisement system (e.g., an online advertising system). Alternatively and/or additionally, the content system may not be an advertisement system. In some examples, the content system may provide content items (e.g., advertisements, images, links, videos, etc.) to be presented via pages associated with the content system. For example, the pages may be associated with websites (e.g., websites providing search engines, email services, news content, communication services, etc.) associated with the content system. The content system may provide content items to be presented in (dedicated) locations throughout the pages (e.g., one or more areas of the pages configured for presentation of content items). For example, a content item may be presented at the top of a web page associated with the content system (e.g., within a banner area), at the side of the web page (e.g., within a column), in a pop-up window, overlaying content of the web page, etc. Alternatively and/or additionally, a content item may be presented within an application associated with the content system and/or within a game associated with the content system. Alternatively and/or additionally, a user may be required to watch and/or interact with the content item before the user can access content of a web page, utilize resources of an application and/or play a game.

At 402, a first plurality of sets of event information associated with a first plurality of events may be identified. In some examples, an event of the first plurality of events may be associated with a presentation of a content item (e.g., a content item, such as an advertisement, provided by the content system) via a client device, wherein the content item may be presented via the client device in response to a request for content. In some examples, the first plurality of events comprises a plurality of intentional click events, a plurality of accidental click events and/or a plurality of skip events. The first plurality of sets of event information may comprise a second plurality of sets of event information associated with the plurality of intentional click events, a third plurality of sets of event information associated with the plurality of accidental click events and/or a fourth plurality of sets of event information associated with the plurality of skip events.

In some examples, an intentional click event of the plurality of intentional click events may correspond to an event in which a content item (e.g., a content item provided by the content system) is presented via a client device and a selection (e.g., a click) of the content item is received via the client device, where the selection is determined (e.g., predicted) to be intentional. In some examples, the selection may be determined (e.g., predicted) to be intentional based upon a dwell time associated with the intentional click event (such as using one or more of the techniques discussed below).

In some examples, an accidental click event of the plurality of accidental click events may correspond to an event in which a content item (e.g., a content item provided by the content system) is presented via a client device and a selection (e.g., a click) of the content item is received via the client device, where the selection is determined (e.g., predicted) to be accidental. In some examples, the selection may be determined (e.g., predicted) to be accidental based upon a dwell time associated with the accidental click event (such as using one or more of the techniques discussed below).

In some examples, a skip event of the plurality of skip events may correspond to an event in which a content item (e.g., a content item provided by the content system) is presented via a client device and a selection (e.g., a click) of the content item is not received via the client device (e.g., the content item is not selected and/or clicked while the content item is presented via the client device).

In some examples, a set of event information of the first plurality of sets of event information may comprise information associated with an event of the first plurality of events. In some examples, the set of event information may comprise content item information associated with a content item associated with the event (e.g., the content item may correspond to a content item that is presented and/or selected in the event), client information associated with a client device and/or a user associated with the event (e.g., the client device may correspond to a client device that receives, selects and/or presents the content item, and/or the user may correspond to a user of the client device), and/or internet resource information associated with an internet resource associated with the event (e.g., the internet resource may correspond to an internet resource on which the content item is presented in the event). The internet resource may be at least one of a web page, a website, an application (e.g., a client application, a mobile application, a platform, etc.).

In an example, the content item information may be indicative of at least one of the content item associated with the event, a content item identifier that identifies the content item, a brand, advertiser and/or company associated with the content item, one or more topics of the content item, one or more products and/or services associated with the content item (e.g., the content item may be used to advertise and/or promote the one or more products and/or the one or more services), a format of the content item (indicative of whether the content item is audio, video or an image, for example), a duration and/or size of the content item, etc.

In an example, the client information may be indicative of at least one of the client device, a device identifier associated with the client device, an IP address associated with the client device, a media access control (MAC) address associated with the client device, a carrier identifier indicative of carrier information associated with the client device, a user identifier (e.g., at least one of a username, an email address, a user account identifier, etc.) associated with the client device and/or the user, a browser cookie (and/or a cookie identifier associated with the client device), activity information (e.g., search history information, website browsing history, email information, etc.) associated with the client device, the user identifier and/or the user, user demographic information (e.g., age, gender, etc.) associated with the client device, the user identifier and/or the user, location information associated with the client device, the user identifier and/or the user, etc. In some examples, the client information may be determined based upon information received from the client device (and/or one or more other devices associated with the user and/or a user account associated with the user). Alternatively and/or additionally, the client information may be generated based upon information received from servers associated with internet resources (e.g., at least one of web pages, applications, mobile applications, etc.) accessed and/or visited by the client device and/or the user.

In an example, the internet resource information may be indicative of at least one of the internet resource, an internet resource identifier associated with the internet resource, a host device associated with the internet resource (e.g., the host device may comprise one or more computing devices, storage and/or a network configured to host the internet resource), a host identifier of the host device, a domain (e.g., a domain name, a top-level domain, etc.) associated with the internet resource, an application identifier associated with the internet resource (e.g., an application), a publisher identifier associated with a publisher of the internet resource, etc.

A first set of event information of the first plurality of sets of event information may be associated with a first event of the first plurality of events. The first event may be associated with a first content item, a first client device (and/or a first user associated with the first client device) and/or a first internet resource (e.g., a web page, an application, a mobile application, etc.).

FIGS. 5A-5M illustrate examples of a system 501 for determining click probabilities associated with content items and/or selecting content for transmission to devices, described with respect to the method 400 of FIG. 4. FIGS. 5A-5G illustrate examples of the first event associated with the first content item (shown with reference number 546 in FIG. 5E), the first client device (shown with reference number 500 in FIG. 5A), and/or the first internet resource (e.g., a fourth web page 544 illustrated in FIG. 5E). The first user (and/or the first client device 500) may access and/or interact with a service, such as a browser, software, a website, an application, an operating system, an email interface, a messaging interface, a music-streaming application, a video application, etc. that provides a platform for accessing internet resources and/or viewing and/or downloading content from a server associated with the content system. In some examples, the content system may use a first user profile associated with the first client device 500 and/or the first user to select content for presentation to the first user. In some examples, the first user profile may comprise at least one of first activity information (e.g., activity information associated with at least one of the first client device 500, the first user, a first user identifier associated with the first client device 500 and/or the first user, etc.), first user demographic information (e.g., user demographic information associated with at least one of the first client device 500, the first user, the first user identifier, etc.), first location information (e.g., location information associated with at least one of the first client device 500, the first user, the first user identifier, etc.), etc.

Figure 5A:
FIG. 5A is a component block diagram illustrating an example system for determining click probabilities associated with content items and/or selecting content for transmission to devices, where a client device presents and/or accesses a first webpage.

FIG. 5A illustrates the first client device 500 presenting and/or accessing a first web page 508 using a browser of the first client device 500. The browser may comprise an address bar 502 comprising a web address (e.g., a uniform resource locator (URL)) of the first web page 508. The first web page 508 may comprise a search interface. For example, the search interface may comprise a web search engine designed to search for information throughout the internet. In some examples, the first web page 508 may comprise a search field 506. For example, a query "stock market" may be entered into the search field 506. In some examples, the first web page 508 may comprise a search selectable input 504 corresponding to performing a search based upon the query. For example, the search selectable input 504 may be selected.

Figure 5B:
FIG. 5B is a component block diagram illustrating an example system for determining click probabilities associated with content items and/or selecting content for transmission to devices, where a client device presents a plurality of search results associated with a query.

FIG. 5B illustrates the first client device 500 presenting a plurality of search results associated with the query using the browser of the first client device 500. For example, the plurality of search results may be presented within a second web page 518. For example, the plurality of search results may comprise a first search result 510 corresponding to a third web page, a second search result 512 corresponding to the fourth web page 544 (illustrated in FIG. 5E), a third search result 514 corresponding to a fifth web page and/or a fourth search result 516 corresponding to a sixth web page.

In some examples, each search result of the plurality of search results may comprise a selectable input (e.g., a link) corresponding to accessing a web page associated with the search result. In some examples, the second search result 512 corresponding to the fourth web page 544 may be selected (e.g., the second search result 512 may be selected via a second selectable input corresponding to the second search result 512).

Figure 5C:
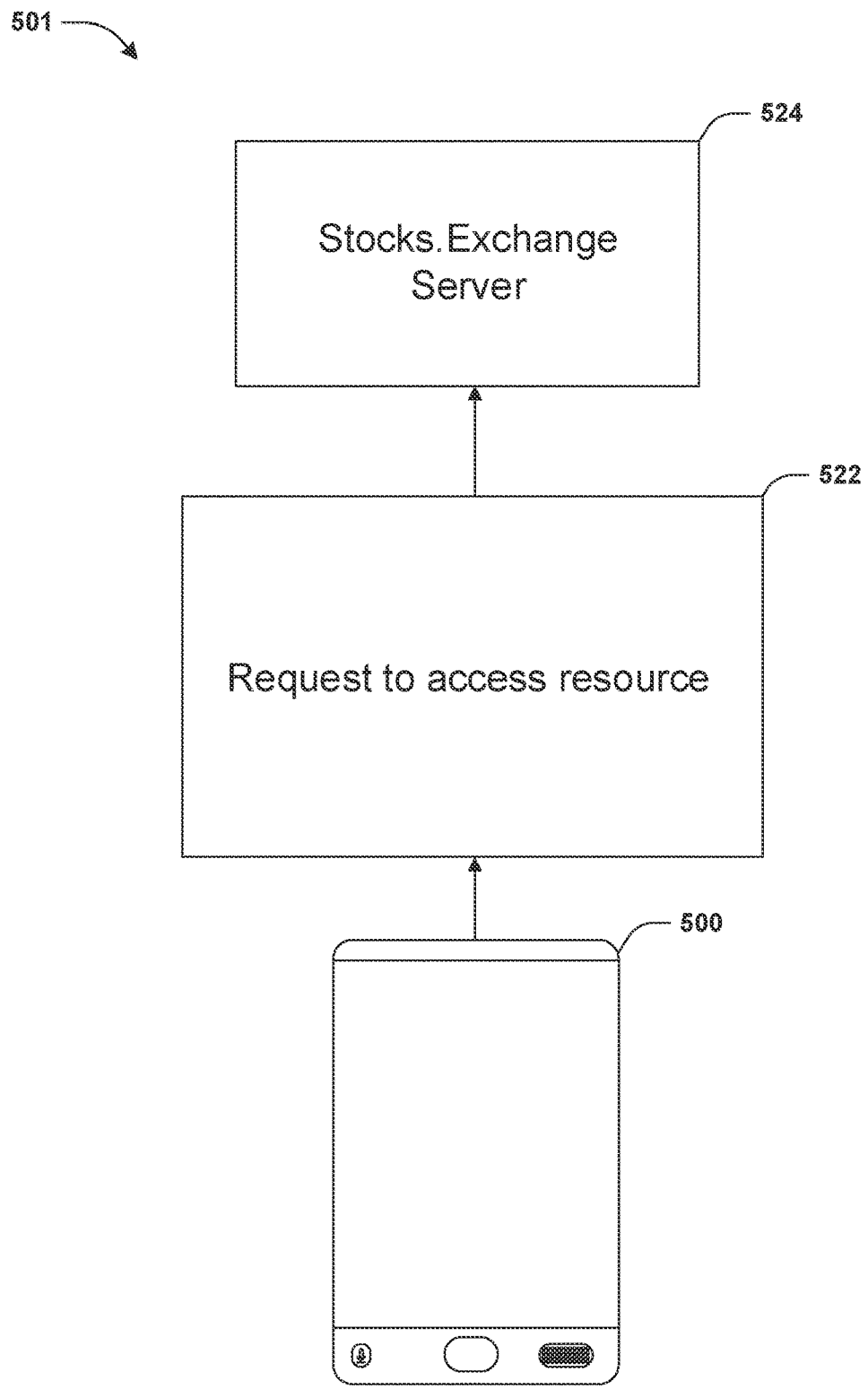
FIG. 5C is a component block diagram illustrating an example system for determining click probabilities associated with content items and/or selecting content for transmission to devices, where a client device transmits a request to access a resource to a server.

FIG. 5C illustrates the first client device 500 transmitting a request 522 to access a resource to a first server 524. In some examples, the request 522 to access the resource may be transmitted in response to the second search result 512 being selected. For example, the resource may correspond to the fourth web page 544. For example, the request 522 to access the resource may comprise an indication of the fourth web page 544 (e.g., a web address "https://stocks.exchange-.com"). Alternatively and/or additionally, the first server 524 may be associated with the fourth web page 544.

Figure 5D:
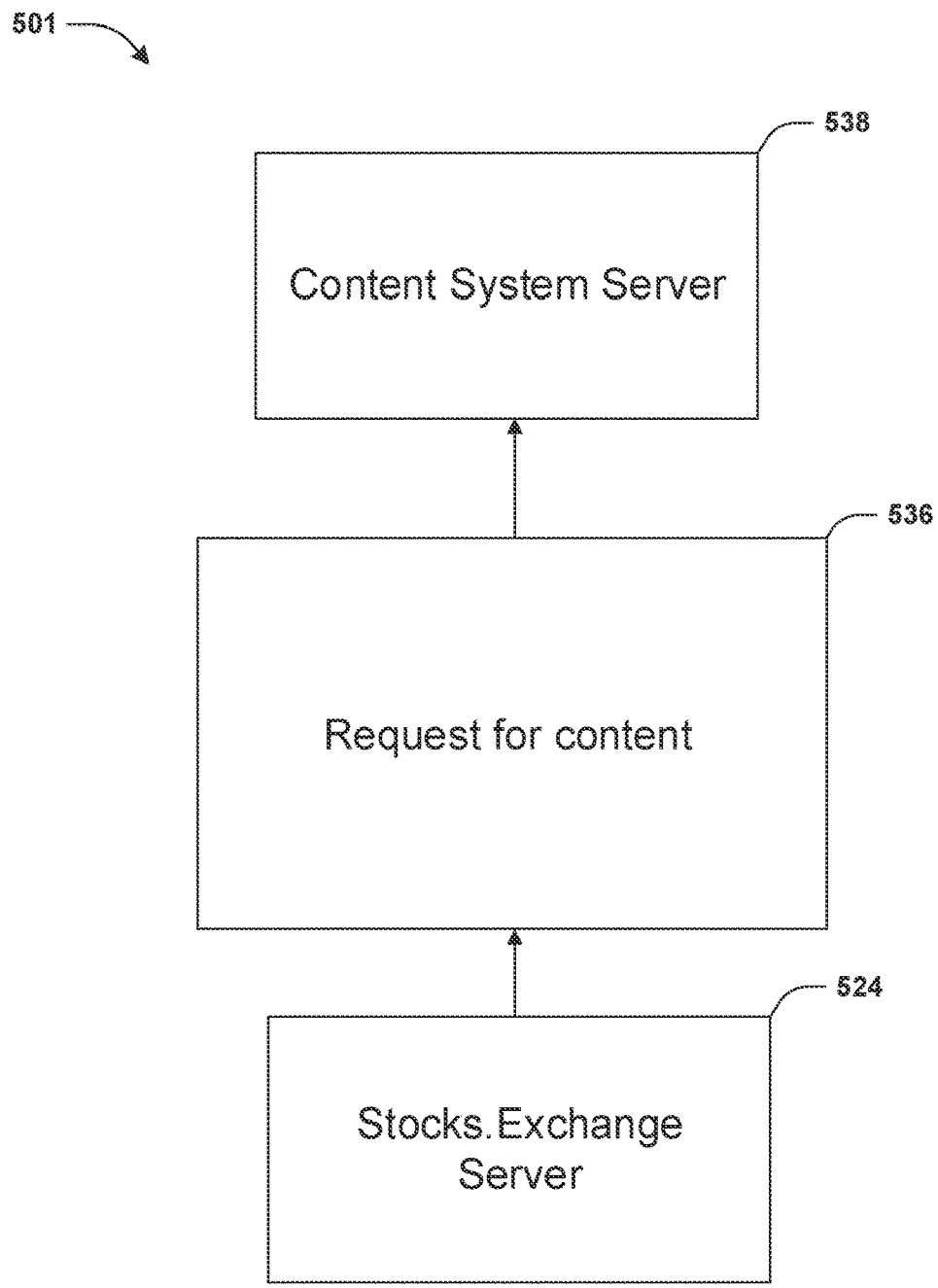
FIG. 5D is a component block diagram illustrating an example system for determining click probabilities associated with content items and/or selecting content for transmission to devices, where a request for content is received.

FIG. 5D illustrates the first server 524 transmitting a first request for content 536 to a second server 538 associated with the content system. In some examples, the first request for content 536 may be transmitted (by the first server 524) in response to receiving the request 522 to access the resource. Alternatively and/or additionally, the first request for content 536 may be transmitted (to the second server 538) by the first client device 500. For example, in response to the first server 524 receiving the request 522 to access the resource, the first server 524 (associated with the fourth web page 544, for example) may transmit first resource information associated with the fourth web page 544 to the first client device. The first client device 500 may transmit the first request for content 536 to the second server 538 in response to receiving the first resource information. In some examples, the first request for content 536 may be a request to be provided with a content item (e.g., an advertisement, an image, a link, a video, etc.) for presentation via the fourth web page 544.

In some examples, the first request for content 536 may comprise identification information associated with the first client device 500, the first user and/or the first internet resource (e.g., the fourth web page 544). For example, the identification information may be used to identify the first internet resource (e.g., the fourth web page 544) and/or the first user profile associated with the first client device 500.

In some examples, a bidding process associated with the first request for content 536 may be performed to select a content item from a first plurality of content items participating in an auction (e.g., an auction for selection of a content item to present via the first client device 500). In some examples, the first plurality of content items (participating in the auction) may comprise the first content item 546.

In some examples, a first bid value associated with the first content item 546 may be determined. The first bid value may be determined based upon at least one of a budget associated with the first content item 546, a first target audience associated with the first content item 546, one or more advertisement campaign goals associated with the first content item 546, a first content item bid value associated with the first content item 546, etc.

Alternatively and/or additionally, the first bid value may be determined based upon a first click probability associated with the first content item 546. In some examples, the first click probability is representative of (e.g., comprises) a probability of receiving a selection (e.g., a click) of the first content item 546 in response to presenting the first content item 546 via the first client device 500 (e.g., a probability that presentation of the first content item 546 via the first client device 500 would be followed by a selection, such as a click, of the first content item 546 on the first client device 500). In some examples, the first click probability is determined based upon the first user profile, internet resource information associated with the first internet resource (e.g., the fourth web page 544), and/or content item information associated with the first content item 546. In an example, the internet resource information may be indicative of at least one of the first internet resource, a first internet resource identifier associated with the first internet resource, a first host device associated with the first internet resource, a first host identifier of the host device, a first domain (e.g., a domain name, a top-level domain, etc.) associated with the first internet resource, a first application identifier associated with the first internet resource (e.g., an application), a first publisher identifier associated with a publisher of the first internet resource, etc. Alternatively and/or additionally, the content item information may be indicative of at least one of the first content item 546, a first content item identifier that identifies the first content item 546, a first brand, advertiser and/or company associated with the first content item 546, one or more first topics of the first content item 546, one or more first products and/or services associated with the first content item 546 (e.g., the first content item 546 may be used to advertise and/or promote the one or more first products and/or services), a first format of the first content item 546, a first duration and/or first size of the first content item 546, etc. In some examples, the first click probability may be determined using one or more of the techniques discussed below with respect to determining a second click probability.

The first bid value may correspond to a value of presenting the first content item 546 via the first client device 500, such as determined based upon at least one of the first click probability, an amount of revenue (indicated by the first content item bid value, for example) associated with receiving a selection of the first content item 546 via the first client device 500, etc.

In some examples, a first plurality of bid values (comprising the first bid value) associated with the first plurality of content items (participating in the auction) may be compared to identify a winner of the auction. In some examples, the winner may correspond to a content item, of the first plurality of content items, associated with a highest bid value among the first plurality of bid values. For example, the first content item 546 may be selected for presentation via the first client device 500 based upon a determination that the first bid value is the highest bid value among the first plurality of bid values (and/or a determination that the first content item 546 is the winner of the auction).

Figure 5E:
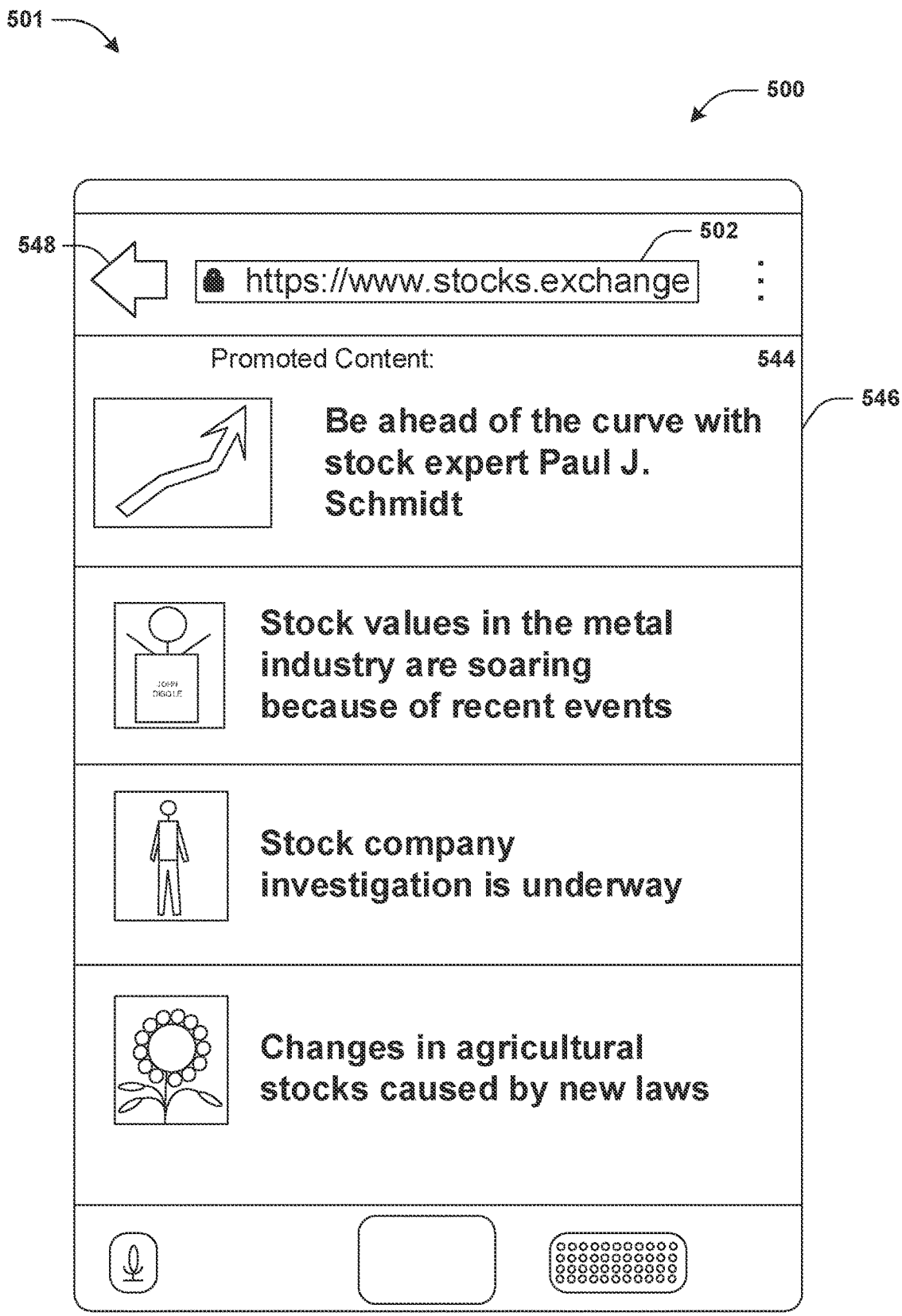
FIG. 5E is a component block diagram illustrating an example system for determining click probabilities associated with content items and/or selecting content for transmission to devices, where a client device presents and/or accesses a fourth webpage displaying a content item.

In some examples, in response to selecting the first content item 546 for presentation via the first client device 500, the first content item 546 may be transmitted to the first client device 500 for presentation via the fourth web page 544. FIG. 5E illustrates the first client device 500 presenting and/or accessing the fourth web page 544 using the browser. For example, the content system may provide the first content item 546 to be presented via the fourth web page 544 while the fourth web page 544 is accessed by the first client device 500.

In some examples, the first event may be determined to be a skip event (and may be included in the plurality of skip events, for example) based upon a determination that the first content item 546 is not selected (e.g., clicked) via the first client device 500 while the first content item 546 is presented via the first client device 500. In an example, occurrence of the skip event may be detected based upon a determination that the content system does not receive information indicative of occurrence of a selection of the first content item 546, via the first client device 500, while the first content item 546 is presented via the first client device 500.

Figure 5F:
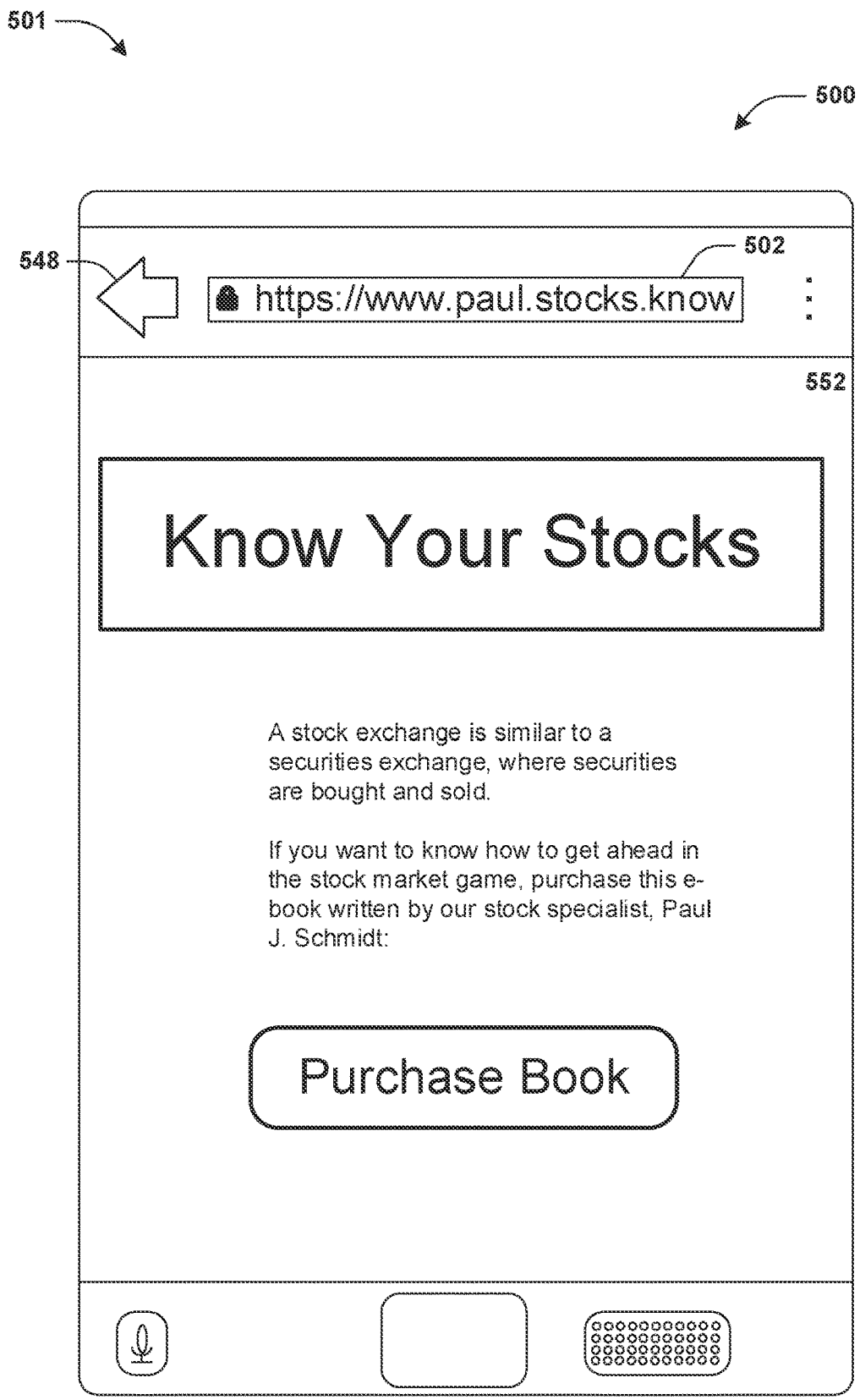
FIG. 5F is a component block diagram illustrating an example system for determining click probabilities associated with content items and/or selecting content for transmission to devices, where a client device presents and/or accesses a seventh webpage in response to a selection of a content item.
Figure 5G:
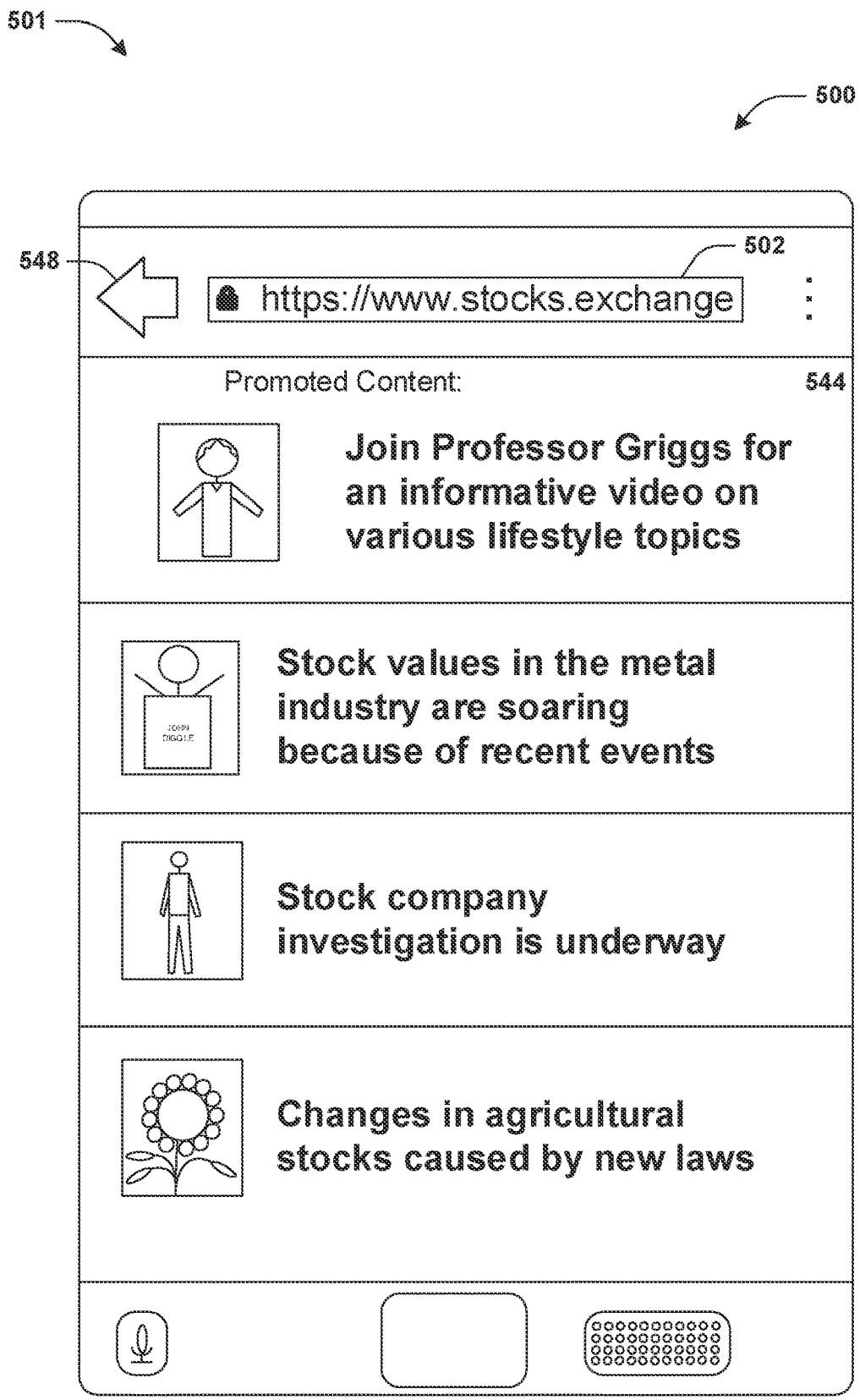
FIG. 5G is a component block diagram illustrating an example system for determining click probabilities associated with content items and/or selecting content for transmission to devices, where a client device returns to a fourth web page.

FIGS. 5F-5G illustrate an example scenario in which the first event is an intentional click event or an accidental click event. In some examples, a selection of the first content item 546 may be received. In response to the selection of the first content item 546, the first client device 500 may present and/or access a second internet resource (e.g., a seventh web page 552) associated with the first content item 546, such as illustrated in FIG. 5F. In an example in which the first content item 546 is an advertisement, the second internet resource (e.g., the seventh web page 552) may correspond to a landing page of the advertisement, such as a web page comprising information associated with one or more products and/or one or more services promoted by the advertisement. In some examples, after the first client device 500 presents and/or access the second internet resource (e.g., the seventh web page 552), the first client device 500 may leave the first internet resource (e.g., the fourth web page 544), such as by at least one of closing the browser, navigating to a different internet resource (e.g., a different web page), returning to the first internet resource (e.g., the fourth web page 544) such as in response to a selection of a back selectable input 548, etc. For example, in response to a selection of the back selectable input 548, the first client device 548 may return to the first internet resource (e.g., the fourth web page 544), such as illustrated in FIG. 5G.

In some examples, the first event may be determined to be an accidental click event (and may be included in the plurality of accidental click events, for example) based upon a determination that a dwell time associated with the selection of the first content item 546 is less than a threshold dwell time (e.g., 3 seconds or other duration of time). In an example, occurrence of the accidental click event may be detected based upon a determination that the dwell time is less than the threshold dwell time. In some examples, the dwell time may be determined based upon a first time and a second time. For example, the dwell time may be determined based upon a difference between the first time and the second time (e.g., if the first time is 9:00:00 and the second time is 9:00:02, the dwell time may be determined to be 2 seconds). In some examples, the first time may correspond to at least one of a time at which the first content item 546 is selected via the first client device 500, a time at which the second internet resource (e.g., the seventh web page 552) is accessed in response to the selection of the first content item 546, a time at which the first client device 500 leaves the first internet resource (e.g., the fourth web page 544) in response to the selection of the first content item 546, etc. In some examples, the second time may correspond to at least one of a time at which the first client device 500 returns to the first internet resource (e.g., the fourth web page 544) after the first content item 546 is selected (in response to the selection of the back selectable input 548, for example), a time at which the first client device 500 leaves the second internet resource (such as by at least one of closing the browser, navigating to a different internet resource (e.g., a different web page), returning to the first internet resource, etc.), etc.

In some examples, the first event may be determined to be an intentional click event (and may be included in the plurality of intentional click events, for example) based upon a determination that the dwell time associated with the selection of the first content item 546 exceeds the threshold dwell time (e.g., the dwell time may be determined based upon the first time and/or the second time). In an example, occurrence of the intentional click event may be detected based upon a determination that the dwell time exceeds the threshold dwell time. Alternatively and/or additionally, occurrence of the intentional click event may be detected based upon a determination that the first content item 546 is selected via the first client device 500 (while the first content item 546 is presented via the first internet resource) and/or that the first client device 500 does not return to the first internet resource (e.g., the fourth web page 544) from the second internet resource (e.g., the seventh web page 552). Alternatively and/or additionally, occurrence of the intentional click event may be detected based upon a determination that the first content item 546 is selected via the first client device 500 (while the first content item 546 is presented via the first internet resource) and/or that the first client device 500 does not access the first internet resource (and/or another internet resource other than the second internet resource) for a threshold period of time after the first time.

In some examples, the threshold dwell time may be a first global dwell time threshold applied for determining whether events of the first plurality of events are accidental click events or intentional click events. Alternatively and/or additionally, the threshold dwell time may be a first traffic segment threshold of a plurality of traffic segment thresholds, wherein each traffic segment threshold of the plurality of traffic segment threshold may be applied for determined whether events of a subset of the first plurality of events are accidental click events or intentional click events. For example, the first traffic segment threshold may be applied to determine whether the first event is an intentional click event or an accidental click event if the first event is associated with one or more first features associated with the first traffic segment threshold. Alternatively and/or additionally, a second traffic segment threshold different than the first traffic segment threshold may be applied to determine whether a different event is an intentional click event or an accidental click event if the different event is associated with one or more second features associated with the second traffic segment threshold.

In an example, the one or more first features associated with the first traffic segment threshold may comprise at least one of one or more first operating systems, one or more first internet resources, one or more first types of devices, etc. Alternatively and/or additionally, the one or more second features associated with the second traffic segment may comprise at least one of one or more second operating systems, one or more second internet resources, one or more second types of devices, etc. In an example, the first traffic segment threshold (rather than the second traffic segment threshold, for example) may be applied to determine whether the first event is an intentional click event or an accidental click event based upon at least one of a determination that an operating system of the first client device 500 matches an operating system of the one or more first operating systems, a determination that the first internet resource matches an internet resource of the one or more first internet resources, a determination that the second internet resource matches an internet resource of the one or more first internet resources, a determination that a type of device of the first client device 500 matches a type of the device of the one or more first types of devices, etc.

In some examples, the first set of event information associated with the first event may be indicative of first content item information associated with the first content item 546 of the first event, first client information associated with the first client device 500 (and/or the first user) of the first event, and/or first internet resource information associated with the first internet resource (e.g., the fourth web page 544) of the first event.

In an example, the first content item information may be indicative of at least one of the first content item 546, the first content item identifier that identifies the first content item 546, the first brand, advertiser and/or company associated with the first content item 546, the one or more first topics of the first content item 546, the one or more first products and/or services associated with the first content item 546, the first format of the first content item 546, the first duration and/or first size of the first content item 546, etc.

In an example, the first client information may be indicative of at least one of the first client device 500, a first device identifier associated with the first client device 500, a first IP address associated with the first client device 500, a first MAC address associated with the first client device 500, a first carrier identifier indicative of carrier information associated with the first client device 500, the first user identifier (e.g., at least one of a username, an email address, a user account identifier, etc.) associated with the first client device 500 and/or the first user, a first browser cookie (and/or a first cookie identifier associated with the first client device 500), the first activity information (e.g., search history information, website browsing history, email information, etc.), the first user demographic information (e.g., age, gender, etc.), the first location information, etc. In some examples, at least some of the first client information may be determined based upon the first user profile associated with the first client device 500 and/or the first user.

In an example, the first internet resource information may be indicative of at least one of the first internet resource, the first internet resource identifier associated with the first internet resource, the first host device associated with the first internet resource, the first host identifier of the host device, the first domain (e.g., a domain name, a top-level domain, etc.) associated with the first internet resource, the first application identifier associated with the first internet resource (e.g., an application), the first publisher identifier associated with a publisher of the first internet resource, etc.

At 404, a plurality of accidental click probabilities associated with a second plurality of events of the first plurality of events may be determined. In some examples, the second plurality of events (associated with the plurality of accidental click probabilities) may comprise the plurality of accidental click events and/or the plurality of skip events the plurality of intentional click events. In an example, the second plurality of events may merely comprise the plurality of accidental click events and the plurality of skip events (without any intentional click event of the plurality of intentional click events, for example). Alternatively and/or additionally, the second plurality of events may merely comprise the plurality of skip events (without any intentional click event of the plurality of intentional click events and without any accidental click event of the plurality of accidental click events, for example). Alternatively and/or additionally, the second plurality of events may merely comprise the plurality of accidental click events (without any intentional click event of the plurality of intentional click events and without any skip event of the plurality of skip events, for example).

In some examples, the plurality of accidental click probabilities may be determined based upon sets of event information, of the first plurality of sets of event information, associated with the second plurality of events. For example, in a scenario in which the second plurality of events comprises the plurality of accidental click events, accidental click probabilities associated with the plurality of accidental click events may be determined based upon the third plurality of sets of event information associated with the plurality of accidental click events. Alternatively and/or additionally, in a scenario in which the second plurality of events comprises the plurality of skip events, accidental click probabilities associated with the plurality of skip events may be determined based upon the fourth plurality of sets of event information associated with the plurality of skip events. Alternatively and/or additionally, in a scenario in which the second plurality of events comprises the plurality of intentional click events, accidental click probabilities associated with the plurality of intentional click events may be determined based upon the second plurality of sets of event information associated with the plurality of intentional click events.

In an example, an accidental click probability of the plurality of accidental click probabilities may be associated with an event (of the second plurality of events) associated with presentation of a content item via a client device. The accidental click probability may be determined based upon a set of event information, of the first plurality of sets of event information, associated with the event. The accidental click probability may be representative of (e.g., comprises) a probability that presentation of the content item via the client device would be followed by occurrence of an accidental click event (in which the content item is accidentally selected and/or a dwell time associated with a selection of the content item is less than the threshold dwell time, for example). For example, although it may be known whether or not the event is an accidental click event when the accidental click probability is determined, the accidental click probability may be determined, based upon the set of event information associated with the event, without considering whether or not the event is determined to be an accidental click event. Alternatively and/or additionally, whether or not the event is an accidental click event may be considered in determining the accidental click probability.

In some examples, in a scenario in which the second plurality of events comprises accidental click events, one or more accidental click probabilities associated with one or more accidental click events may be between 0 and 1 (and/or between 0% and 100%). Alternatively and/or additionally, in a scenario in which the second plurality of events comprises non-accidental click events (e.g., skip events and/or intentional click events), one or more accidental click probabilities associated with one or more non-accidental click events may be between 0 and 1 (and/or between 0% and 100%).

In an example in which the first event is included in the second plurality of events, a first accidental click probability, associated with the first event, may be determined based upon the first set of event information associated with the first event. The first accidental click probability associated with the first event may be representative of (e.g., comprises) a probability that, given the first set of event information associated with the first event, presentation of the first content item 546 via the first client device 500 would be followed by occurrence of an accidental click event (e.g., a probability that presenting the first content item 546 in response to the first request for content 536 is followed by an accidental selection of the first content item 546). In some examples, whether or not the first event is an accidental click event may not be considered in determining the first accidental click probability. For example, even if the first event is an accidental click event, the first accidental click probability associated with the first event may be determined to be a probability other than 1 (and/or 100%) (e.g., the first accidental click probability associated with the first event may be determined to be between 0 and 1 and/or between 0% and 100%). Alternatively and/or additionally, even if the first event is a non-accidental click event (e.g., a skip event and/or an intentional click event), the first accidental click probability associated with the first event may be determined to be a probability other than 0 (and/or 0%) (e.g., the first accidental click probability associated with the first event may be determined to be between 0 and 1 and/or between 0% and 100%). Alternatively and/or additionally, whether or not the first event is an accidental click event may be considered in determining the first accidental click probability. For example, the first accidental click probability may be increased (by a value, by a proportion, by a percentage and/or by a factor, for example) in a scenario in which the first event is considered to be an accidental click event as compared to a scenario in which the first event is considered to be a non-accidental click event (such as a skip event and/or an intentional click event). In an example, in a scenario in which the first event is considered to be an accidental click event, the first accidental click probability may be determined to be 0.06 (and/or 6%), and/or in a scenario in which the first event is considered to be a non-accidental click event, the first accidental click probability may be determined to be 0.03 (and/or 3%).

In some examples, the first accidental click probability may be determined based upon a first proportion of events (e.g., events comprising accidental click events, skip events and/or intentional click events) that are accidental click events. For example, the first proportion of events that are accidental click events may correspond to a proportion of events, of the first plurality of events, that are accidental click events (such as determined based upon a quantity of the first plurality of events and/or a quantity of accidental click events of the plurality of accidental click events). In an example, the accidental click probability may be equal to the first proportion of events that are accidental click events. Alternatively and/or additionally, one or more operations (e.g., mathematical operations) may be performed using the first proportion of events that are accidental click events (and/or one or more other values) to determine the first accidental click probability.

Alternatively and/or additionally, the first accidental click probability may be determined based upon the first internet resource (e.g., the fourth web page 544) associated with the first event. For example, a second proportion of events (e.g., events comprising accidental click events, skip events and/or intentional click events) that are accidental click events may be determined based upon the first internet resource. For example, the second proportion of events that are accidental click events may correspond to a proportion of events, of events associated with the first internet resource, that are accidental click events (such as determined based upon a quantity of the events associated with the first internet resource and/or a quantity of accidental click events associated with the first internet resource). In an example, the accidental click probability may be equal to the second proportion of events that are accidental click events. Alternatively and/or additionally, one or more operations (e.g., mathematical operations) may be performed using the second proportion of events that are accidental click events (and/or one or more other values, such as the first proportion of events that are accidental click events) to determine the first accidental click probability.

Alternatively and/or additionally, the first accidental click probability may be determined based upon the first content item 546 associated with the first event. For example, a third proportion of events (e.g., events comprising accidental click events, skip events and/or intentional click events) that are accidental click events may be determined based upon the first content item 546. For example, the third proportion of events that are accidental click events may correspond to a proportion of events, of events associated with the first content item 546, that are accidental click events (such as determined based upon a quantity of the events associated with the first content item 546 and/or a quantity of accidental click events associated with the first content item 546). In an example, the accidental click probability may be equal to the third proportion of events that are accidental click events. Alternatively and/or additionally, one or more operations (e.g., mathematical operations) may be performed using the third proportion of events that are accidental click events (and/or one or more other values, such as the first proportion of events that are accidental click events and/or the second proportion of events that are accidental click events) to determine the first accidental click probability.

In some examples, accidental click probabilities, of the plurality of accidental click probabilities, other than the first accidental click probability may be determined using one or more of the techniques discussed herein with respect to determining the first accidental click probability.

Figure 5H:
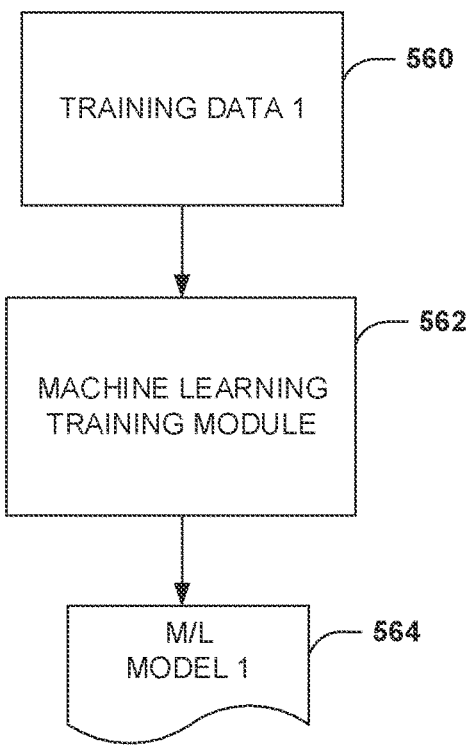
FIG. 5H is a component block diagram illustrating an example system for determining click probabilities associated with content items and/or selecting content for transmission to devices, where a machine learning training module performs machine learning model training to generate a first machine learning model.

Alternatively and/or additionally, the plurality of accidental click probabilities may be determined using a first machine learning model. In some examples, machine learning model training may be performed using first training data to generate the first machine learning model. FIG. 5H illustrates a machine learning training module 562 performing machine learning model training to generate the first machine learning model (shown with reference number 564 in FIG. 5H). In an example, the first training data (shown with reference number 560 in FIG. 5H) may be input to the machine learning training module 562. The machine learning training module 562 may generate the first machine learning model 564 using the first training data 560.

In some examples, the first training data 560 may comprise accidental click event information associated with a second plurality of accidental click events and/or skip event information associated with a second plurality of skip events. In some examples, the second plurality of accidental click events may be the same as the plurality of accidental click events of the first plurality of events. Alternatively and/or additionally, the second plurality of accidental click events may be different than the plurality of accidental click events. Alternatively and/or additionally, the second plurality of accidental click events may comprise one, some and/or all of the plurality of accidental click events. Alternatively and/or additionally, the second plurality of accidental click events may not comprise any of the plurality of accidental click events.

In some examples, the second plurality of skip events may be the same as the plurality of skip events of the first plurality of events. Alternatively and/or additionally, the second plurality of skip events may be different than the plurality of skip events. Alternatively and/or additionally, the second plurality of skip events may comprise one, some and/or all of the plurality of skip events. Alternatively and/or additionally, the second plurality of skip events may not comprise any of the plurality of skip events.

In some examples, the accidental click information may comprise a fifth plurality of sets of event information associated with the second plurality of accidental click events, wherein a set of event information of the fifth plurality of sets of event information may comprise at least one of content item information, client information, internet resource information, etc. associated with an accidental click event of the second plurality of sets of accidental click events. In some examples, the fifth plurality of sets of event information may be the same as the third plurality of sets of event information of the first plurality of sets of event information. Alternatively and/or additionally, the fifth plurality of sets of event information may be different than the third plurality of sets of event information. Alternatively and/or additionally, the fifth plurality of sets of event information may comprise one, some and/or all of the third plurality of sets of event information. Alternatively and/or additionally, the fifth plurality of sets of event information may not comprise any of the third plurality of sets of event information.

In some examples, the skip information may comprise a sixth plurality of sets of event information associated with the second plurality of skip events, wherein a set of event information of the sixth plurality of sets of event information may comprise at least one of content item information, client information, internet resource information, etc. associated with a skip event of the second plurality of sets of skip events. In some examples, the sixth plurality of sets of event information may be the same as the fourth plurality of sets of event information of the first plurality of sets of event information. Alternatively and/or additionally, the sixth plurality of sets of event information may be different than the fourth plurality of sets of event information. Alternatively and/or additionally, the sixth plurality of sets of event information may comprise one, some and/or all of the fourth plurality of sets of event information. Alternatively and/or additionally, the sixth plurality of sets of event information may not comprise any of the fourth plurality of sets of event information.

Figure 5I:
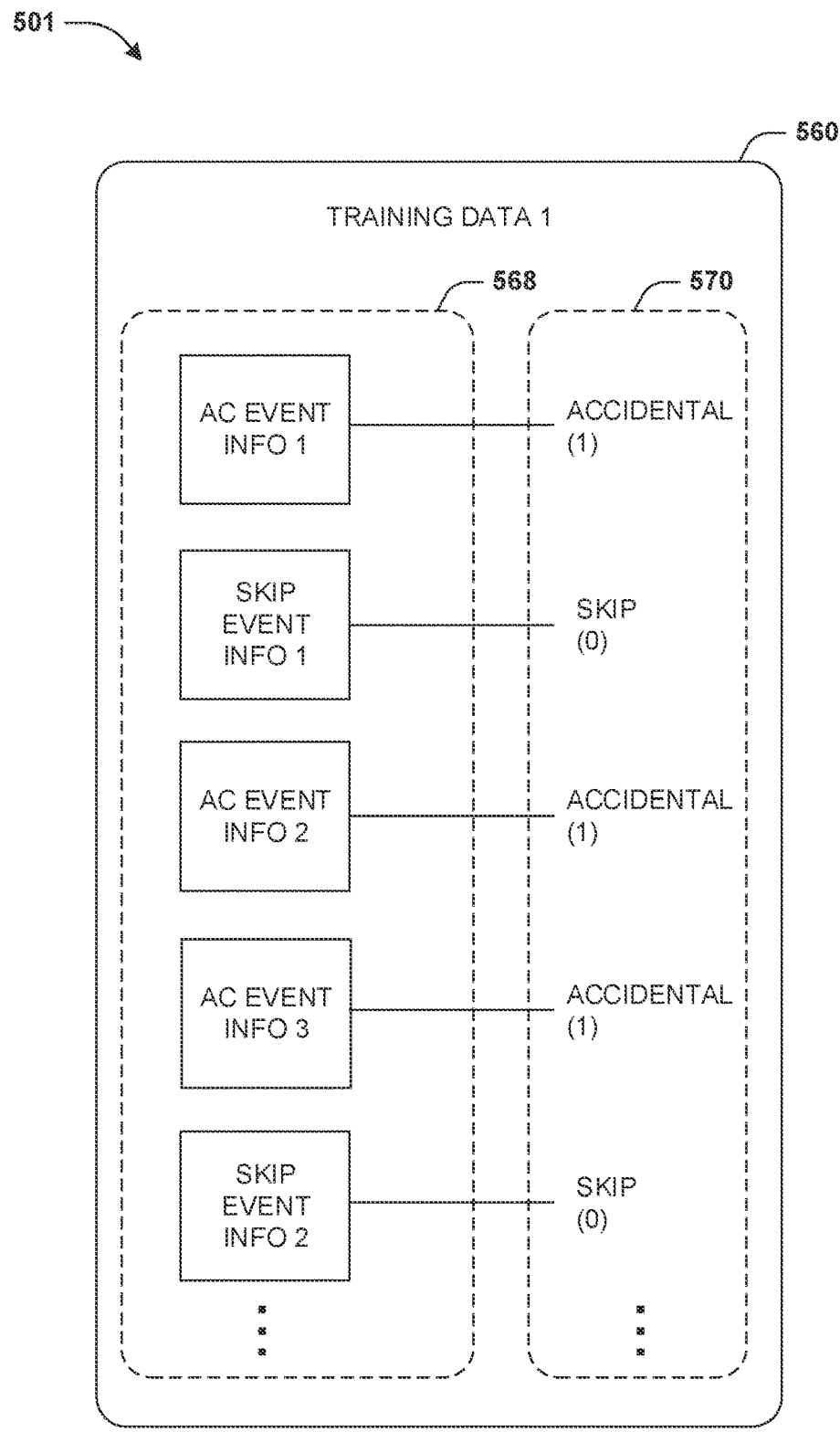
FIG. 5I is a component block diagram illustrating example training data of an example system for determining click probabilities associated with content items and/or selecting content for transmission to devices.

FIG. 5I illustrates an example of the first training data 560. In some examples, the first training data 560 may comprise a plurality of sets of training data 568 and/or first target information 570 (e.g., target attributes associated with the first plurality of sets of training data). The plurality of sets of training data 568 may comprise the fifth plurality of sets of event information and/or the sixth plurality of sets of event information. For example, a first subset of the plurality of sets of training data 568 may comprise the fifth plurality of sets of event information and/or a second subset of the plurality of sets of training data 568 may comprise the sixth plurality of sets of event information (e.g., each set of training data of the first subset may comprise a set of event information of the fifth plurality of sets of event information and/or each set of training data of the second subset may comprise a set of event information of the sixth plurality of sets of event information).

In some examples, the first target information 570 may comprise a first plurality of labels. The first plurality of labels comprises a second plurality of labels associated with the fifth plurality of sets of event information (e.g., the first subset) and/or a third plurality of labels associated with the sixth plurality of sets of event information (e.g., the second subset). In some examples, the first plurality of labels may be indicative of classifications. In some examples, the second plurality of labels, that are associated with the fifth plurality of sets of event information, may be indicative of a first classification (e.g., a classification corresponding to accidental click events) and/or a first value (e.g., 1). Alternatively and/or additionally, the third plurality of labels, that are associated with the sixth plurality of sets of event information, may be indicative of a second classification (e.g., a classification corresponding to skip events) and/or a second value (e.g., 0).

In FIG. 5I, a label of the second plurality of labels (shown as "ACCIDENTAL (1)" in FIG. 5I) is associated with a set of event information (shown as "AC EVENT INFO" in FIG. 5I) of the fifth plurality of sets of event information associated with the second plurality of accidental click events. A label of the third plurality of labels (shown as "SKIP (0)" in FIG. 5I) is associated with a set of event information (shown as "SKIP EVENT INFO" in FIG. 5I) of the sixth plurality of sets of event information associated with the second plurality of skip events. In some examples, the fifth plurality of sets of event information associated with the second plurality of accidental click events may be labeled as corresponding to positive events. Alternatively and/or additionally, the sixth plurality of sets of event information associated with the second plurality of skip events may be labeled as corresponding to negative events. For example, a value (e.g., 0) indicated by the third plurality of labels may be lower than a value (e.g., 1) indicated by the second plurality of labels.

Figure 5J:
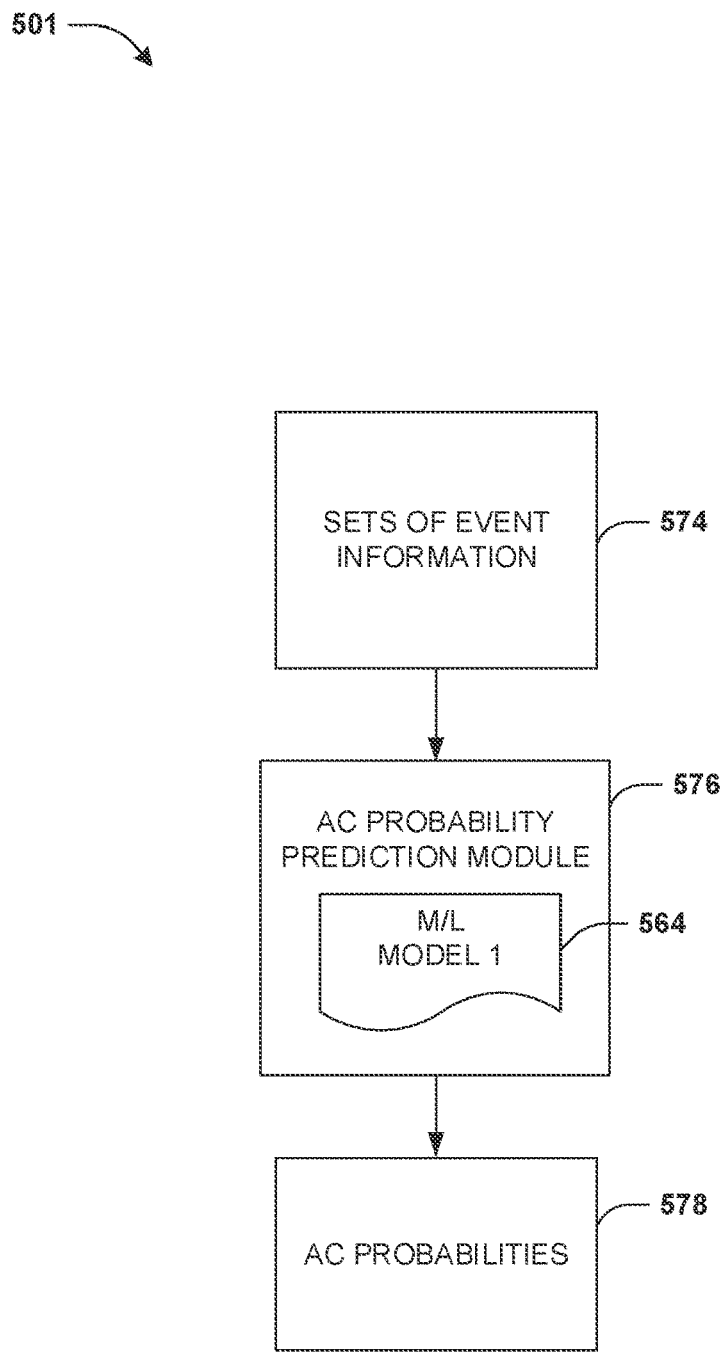
FIG. 5J is a component block diagram illustrating an example system for determining click probabilities associated with content items and/or selecting content for transmission to devices, where a plurality of accidental click probabilities is determined using a first machine learning model.

In some examples, the first machine learning model 564 may be trained and/or configured to determine an accidental click probability based upon a set of event information, such as a set of event information associated with an event of the second plurality of events. FIG. 5J illustrates the plurality of accidental click probabilities (shown with reference number 578 in FIG. 5J) being determined using the first machine learning model 564. In an example, the first machine learning model 564 may be loaded into an accidental click probability prediction module 576. A plurality of sets of event information 574 associated with the second plurality of events may be input to the accidental click probability prediction module 576. The accidental click probability prediction module 576 may use the first machine learning model 564 to determine the plurality of accidental click probabilities 578 based upon the plurality of sets of event information 574. For example, an accidental click probability, of the plurality of accidental click probabilities 578, associated with an event may be determined (using the accidental click probability prediction module 576 and/or the first machine learning model 564, for example) based upon a set of event information, of the plurality of sets of event information 574, associated with the event. Alternatively and/or additionally, for each event of the second plurality of events, an accidental click probability (of the plurality of accidental click probabilities 578) may be determined (using the accidental click probability prediction module 576 and/or the first machine learning model 564, for example) based upon a set of event information, of the plurality of sets of event information 574, associated with the event.

Figure 5K:
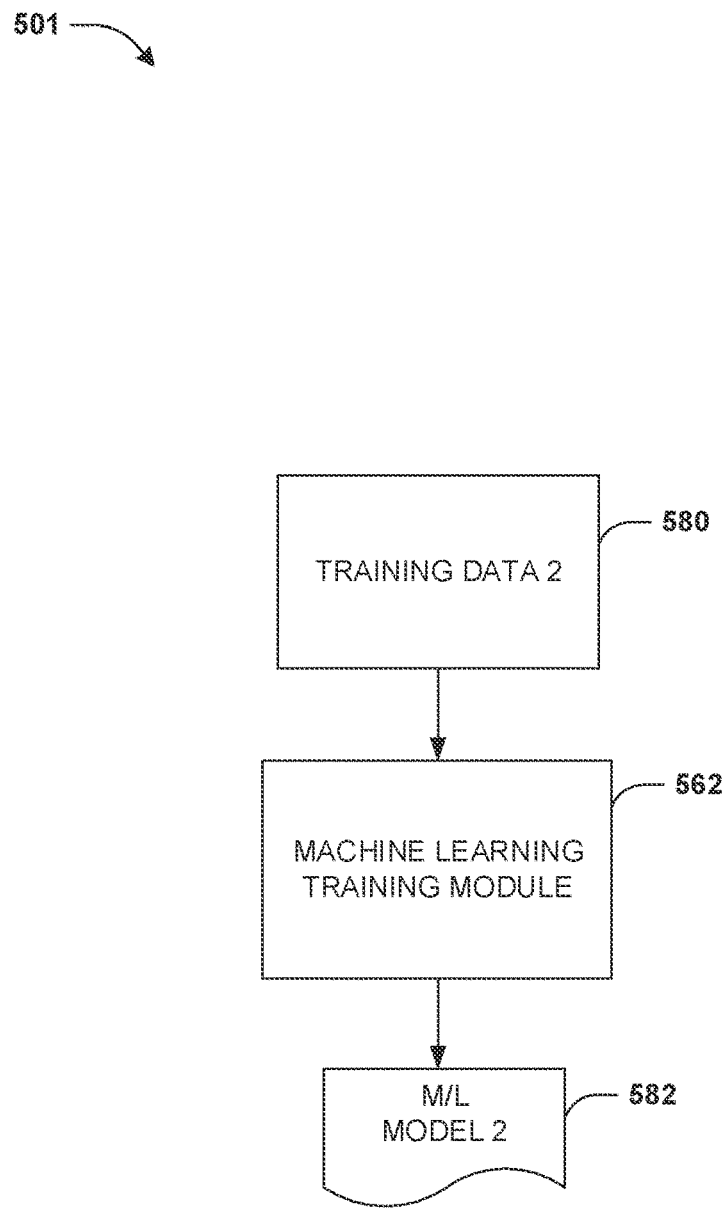
FIG. 5K is a component block diagram illustrating an example system for determining click probabilities associated with content items and/or selecting content for transmission to devices, where a machine learning training module performs machine learning model training to generate a second machine learning model.

At 406, machine learning model training may be performed using the first plurality of sets of event information and a fourth plurality of labels associated with the first plurality of events to generate a second machine learning model. FIG. 5K illustrates the machine learning training module 562 performing machine learning model training to generate the second machine learning model (shown with reference number 582 in FIG. 5K). In an example, second training data 580 may be input to the machine learning training module 562. The machine learning training module 562 may generate the second machine learning model 582 using the second training data 582.

Figure 5L:
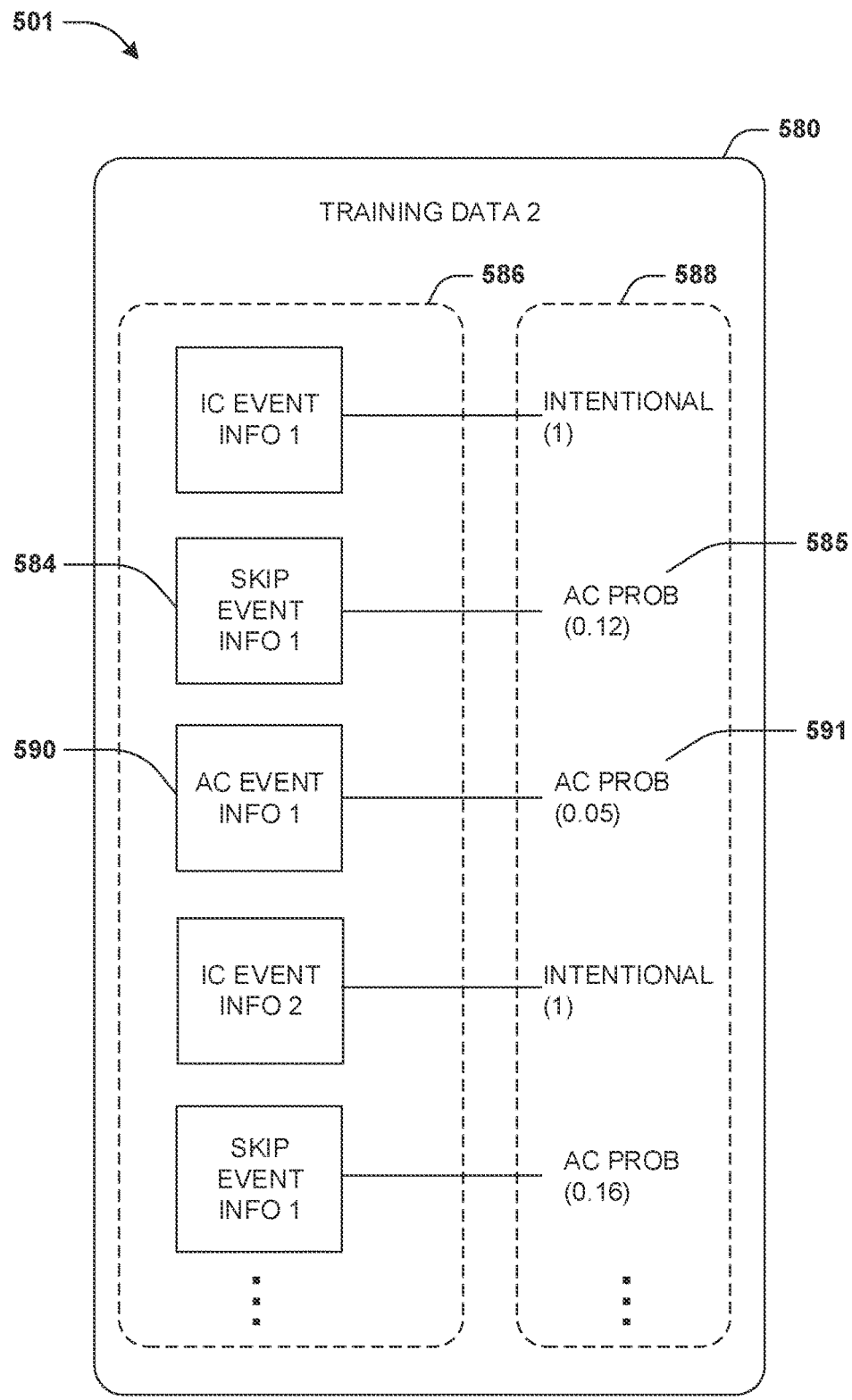
FIG. 5L is a component block diagram illustrating example training data of an example system for determining click probabilities associated with content items and/or selecting content for transmission to devices.

In some examples, the second training data 580 may comprise the first plurality of sets of event information and/or the fourth plurality of labels. FIG. 5L illustrates an example of the second training data 580. In some examples, the second training data 580 may comprise the first plurality of sets of event information (shown with reference number 586 in FIG. 5L) and/or second target information 588 (e.g., target attributes associated with the first plurality of sets of event information 586). In some examples, the second target information 588 comprises the fourth plurality of labels.

In some examples, the fourth plurality of labels comprises a fifth plurality of labels and a sixth plurality of labels. The fifth plurality of labels may be associated with the plurality of intentional click events and/or the second plurality of sets of event information (associated with the plurality of intentional click events). In some examples, labels of the fifth plurality of labels may correspond to an intentional click classification (e.g., a classification corresponding to intentional click events). For example, in FIG. 5L, labels of the fifth plurality of labels are shown as "INTENTIONAL (1)". A label of the fifth plurality of labels may indicate that a set of event information (of the second plurality of sets of event information), associated with the label, is associated with an intentional click event. In some examples, the second plurality of sets of event information associated with the plurality of accidental click events may be labeled as corresponding to positive events (e.g., 1). For example, the fifth plurality of labels may comprise positive labels (indicative of 1, for example). In some examples, each label of the second plurality of labels may be indicative of a value (e.g., 1) associated with the intentional click classification.

The sixth plurality of labels may be associated with the second plurality of events. The sixth plurality of labels may be based upon (e.g., may correspond to and/or be indicative of) the plurality of accidental click probabilities. For example, a label (of the sixth plurality of labels) that is associated with an event of the second plurality of events may be determined based upon an accidental click probability, of the plurality of accidental click probabilities, associated with the event. In an example, the label may be indicative of a value that is equal to the accidental click probability. Alternatively and/or additionally, the label may be indicative of a value that is different than the accidental click probability (e.g., one or more operations, such as mathematical operations, may be performed using the accidental click probability and one or more other values to determine the value of the label).

In an example in which the second plurality of events (for which accidental probabilities of the plurality of accidental probabilities are determined, for example) comprises the plurality of accidental click events, the sixth plurality of labels may comprise first labels associated with the plurality of accidental click events and/or the third plurality of sets of event information (associated with the plurality of accidental click events). In some examples, the first labels may be based upon (e.g., may correspond to and/or be indicative of) accidental click probabilities, of the plurality of accidental click probabilities, associated with the plurality of accidental click events. In an example, the first labels may comprise a label 591 (shown as "AC PROB (0.05)") associated with a set of event information 590 (shown as "AC EVENT INFO 1") that is associated with an accidental click event of the plurality of accidental click events (e.g., the set of event information 590 comprises event information corresponding to the accidental click event). The label 591 may be based upon (e.g., may correspond to and/or be indicative of) an accidental click probability (e.g., 0.05), of the plurality of accidental click probabilities, associated with the accidental click event.

In an example in which the second plurality of events (for which accidental probabilities of the plurality of accidental probabilities are determined, for example) comprises the plurality of skip events, the sixth plurality of labels may comprise second labels associated with the plurality of skip events and/or the fourth plurality of sets of event information (associated with the plurality of skip events). In some examples, the second labels may be based upon (e.g., may correspond to and/or be indicative of) accidental click probabilities, of the plurality of accidental click probabilities, associated with the plurality of skip events. In an example, the second labels may comprise a label 585 (shown as "AC PROB (0.12)") associated with a set of event information 584 (shown as "SKIP EVENT INFO 1") that is associated with a skip event of the plurality of skip events (e.g., the set of event information 584 comprises event information corresponding to the skip event). The label 585 may be based upon (e.g., may correspond to and/or be indicative of) an accidental click probability (e.g., 0.05), of the plurality of accidental click probabilities, associated with the skip event.

Accordingly, in some examples, the fourth plurality of labels may correspond to a non-binary label set, where at least some of the fourth plurality of labels (such as labels, of the fourth plurality of labels, that are based upon accidental click probabilities) are indicative of values that are not equal to 0 or 1. In some examples, the second machine learning model 582 may be trained using a first loss function. The first loss function may be able to handle a non-binary label set, such as the fourth plurality of labels. In some examples, the first loss function may comprise a binary cross-entropy loss function (and/or a different type of loss function). In an example, the first loss function may comprise $\mathcal{L}'(p, \ell) = \ell \ln(\ell \div p) + (1-\ell) \ln((1-\ell) \div (1-p))$, where $\ell$ corresponds to a label associated with an event (e.g., an event associated with presentation of a content item via a client device, such as in response to a request for content) and/or p corresponds to a prediction associated with the event (e.g., the prediction may correspond to a click probability, associated with presenting the content item via the client device, determined using the second machine learning model 582 in response to receiving the request for content). In an example, label l associated with the event may be determined after occurrence of the event. In some examples, if the event is an intentional click event, the label l may correspond to the intentional click classification (e.g., the label l may be equal to 1). Alternatively and/or additionally, if the event is an accidental click event and/or a skip event, the label l may be based upon (e.g., may correspond to and/or be indicative of) an accidental click probability associated with the event (e.g., an accidental click probability determined using the accidental click probability prediction module 576 and/or the first machine learning model 564 using one or more of the techniques discussed herein). In some examples, loss (e.g., $\mathcal{L}'(p, l)$) determined using the first loss function may be representative of a deviation of the prediction (e.g., the click probability determined using the second machine learning model 582) from the label.

In some examples, the second machine learning model 582 may be trained and/or configured to determine a click probability associated with presentation of a content item via a client device. The click probability may be determined in response to receiving a request for content associated with the client device. Alternatively and/or additionally, the click probability may be determined based upon content item information associated with the content item, client information associated with the client device, and/or internet resource information associated with an internet resource associated with the request for content, etc.

At 408, a second request for content associated with a second client device may be received. In some examples, the second request for content may be associated with a second internet resource (e.g., a web page, an application, a mobile application, etc.). For example, the second request for content may be a request to be provided with a content item (e.g., an advertisement, an image, a link, a video, etc.) for presentation via the second client device on the second internet resource.

In some examples, the second request for content may comprise second identification information associated with the second client device, a second user associated with the second client device and/or the second internet resource. For example, the second identification information may be used to identify the second internet resource and/or a second user profile associated with the second client device.

At 410, a second plurality of click probabilities associated with a second plurality of content items may be determined using the second machine learning model. In some examples, the second plurality of click probabilities may be determined in response to receiving the second request for content. The second plurality of click probabilities may comprise a second click probability associated with a second content item (e.g., an advertisement, an image, a link, a video, etc.) of the second plurality of content items. In some examples, the second click probability is representative of (e.g., comprises) a probability of receiving a selection (e.g., a click) of the second content item responsive to presenting the second content item via the second client device (e.g., a probability that presentation of the second content item via the second client device would be followed by a selection, such as a click, of the second content item on the second client device).

In some examples, one or more features associated with the second request for content may be determined. The one or more features may comprise second client information associated with the second client device and/or second internet resource information associated with the second internet resource. Determining the second plurality of click probabilities using the second machine learning model may be based upon the one or more features. In some examples, the second click probability is determined based upon the second client information associated with the second client device, second content item information associated with the second content item and/or the second internet resource information associated with the second internet resource.

In an example, the second content item information may be indicative of at least one of the second content item, a second content item identifier that identifies the second content item, a second brand, advertiser and/or company associated with the second content item, one or more second topics of the second content item, one or more second products and/or services associated with the second content item (e.g., the content item may be used to advertise and/or promote the one or more products and/or the one or more services), a second format of the second content item (indicative of whether the second content item is audio, video or an image, for example), a second duration and/or size of the second content item, etc.

In an example, the second client information may be indicative of at least one of the second client device, a second device identifier associated with the second client device, a second IP address associated with the second client device, a second MAC address associated with the second client device, a second carrier identifier indicative of second carrier information associated with the second client device, a second user identifier (e.g., at least one of a username, an email address, a user account identifier, etc.) associated with the second client device and/or the second user, a second browser cookie (and/or a second cookie identifier associated with the second client device), second activity information (e.g., search history information, website browsing history, email information, etc.) associated with the second client device, the second user identifier and/or the second user, second user demographic information (e.g., age, gender, etc.) associated with the second client device, the second user identifier and/or the second user, second location information associated with the second client device, the second user identifier and/or the second user, etc.

In an example, the second internet resource information may be indicative of at least one of the second internet resource, a second internet resource identifier associated with the second internet resource, a second host device associated with the second internet resource (e.g., the second host device may comprise one or more computing devices, storage and/or a network configured to host the second internet resource), a second host identifier of the second host device, a second domain (e.g., a domain name, a top-level domain, etc.) associated with the second internet resource, a second application identifier associated with the second internet resource (e.g., an application), a second publisher identifier associated with a second publisher of the second internet resource, etc.

Figure 5M:
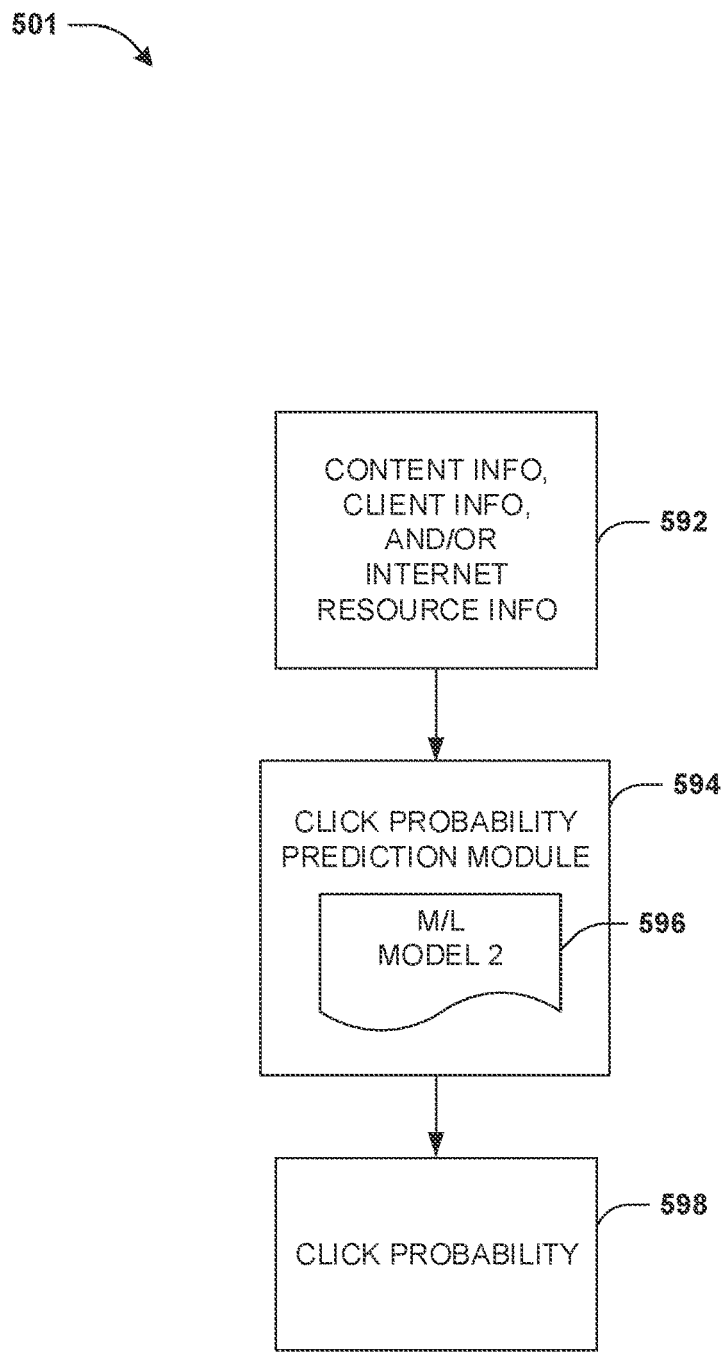
FIG. 5M is a component block diagram illustrating an example system for determining click probabilities associated with content items and/or selecting content for transmission to devices, where a click probability is determined using a second machine learning model.

FIG. 5M illustrates the second click probability (shown with reference number 598 in FIG. 5M) being determined using the second machine learning model 596. In an example, the second machine learning model 596 may be loaded into a click probability prediction module 594. Information 592, comprising the second content item information, the second client information and/or the second internet resource information, may be input to the click probability prediction module 594. The click probability prediction module 594 may use the second machine learning model 596 to determine the second click probability 598 based upon the information 592.

Alternatively and/or additionally, embodiments of the present disclosure are contemplated in which the second click probability (and/or other click probabilities of the second plurality of click probabilities) is determined using one or more techniques other than (and/or in addition to) using the second machine learning model 596. For example, the second click probability may be determined, based upon the information 592, the plurality of accidental click probabilities and/or the first plurality of sets of event information, using one or more techniques other than (and/or in addition to) using the second machine learning model 596.

In some examples, click probabilities, other than the second click probability, of the second plurality of click probabilities may be determined using one or more of the techniques discussed herein with respect to determining the second click probability associated with the second content item.

At 412, the second content item may be selected for presentation via the second client device based upon the second plurality of click probabilities. For example, the second content item may be selected for presentation via the second client device based upon a determination that the second click probability associated with the second content item is a highest click probability among the second plurality of click probabilities.

Alternatively and/or additionally, a bidding process of a second auction associated with the second request for content may be performed to select a content item from the second plurality of content items for presentation via the second client device. In some examples, a second plurality of bid values associated with the second plurality of content items may be determined based upon the second plurality of click probabilities. For example, the second plurality of bid values may comprise a second bid value associated with the second content item. In some examples, the second bid value may be determined based upon the second click probability and at least one of a budget associated with the second content item, a second target audience associated with the second content item, one or more advertisement campaign goals associated with the second content item, a second content item bid value associated with the second content item, etc.

In some examples, the second bid value may correspond to a value of presenting the second content item via the second client device, such as determined based upon at least one of the second click probability, an amount of revenue (indicated by the second content item bid value, for example) associated with a selection of the second content item via the second client device, etc. In an example where the second click probability is 10% and/or the amount of revenue associated with receiving a selection of the second content item via the second client device is $50.00, the second bid value may correspond to a combination of the second click probability and the amount of revenue (e.g., the second bid value may correspond to 10%×$50.00=$5.00).

In some examples, the second plurality of bid values (comprising the second bid value) associated with the second plurality of content items may be compared to identify a winner of the second auction. In some examples, the winner may correspond to a content item, of the second plurality of content items, associated with a highest bid value among the second plurality of bid values. For example, the second content item may be selected for presentation via the second client device based upon a determination that the second bid value is the highest bid value among the second plurality of bid values (and/or a determination that the second content item is the winner of the second auction).

In some examples, in response to selecting the second content item for presentation via the second client device, the second content item may be transmitted to the second client device for presentation via the second internet resource. For example, the content system may provide the second content item to be presented via the second internet resource while the second internet resource is accessed by the second client device (e.g., the second client device may present the second content item via the second internet resource).

Figure 6:
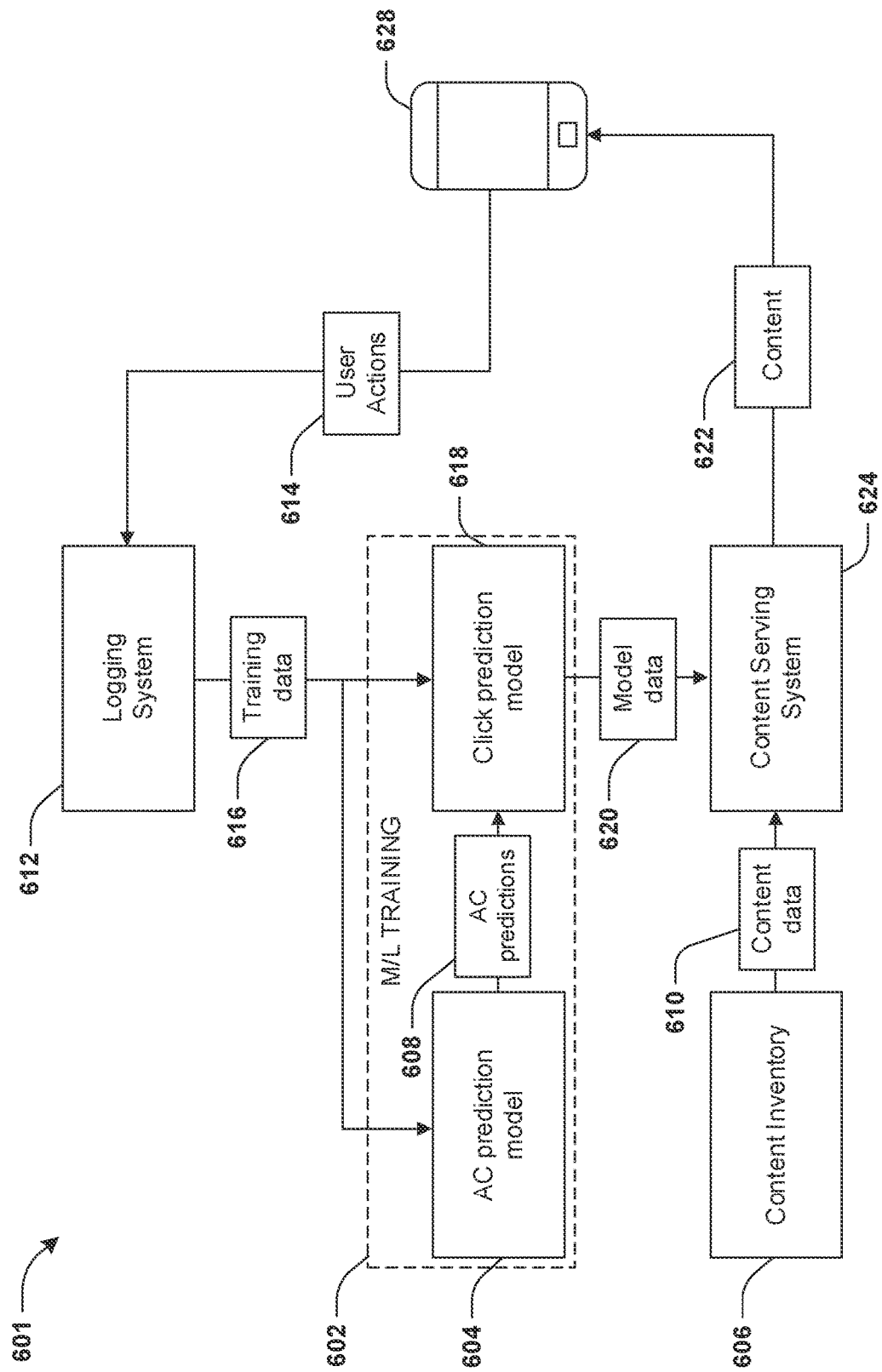
FIG. 6 is a component block diagram illustrating an example system for determining click probabilities associated with content items and/or selecting content for transmission to devices.

FIG. 6 illustrates an example of a system 601 for determining click probabilities associated with content items and/or selecting content for transmission to devices, described with respect to the method 400 of FIG. 4. A logging system 612 may receive information 614 indicative of user actions from one or more client devices 628 and/or one or more computers (e.g., servers associated with internet resources accessed by the one or more client devices 628). For example, the information 614 may be indicative of user activity associated with events of the first plurality of events.

The logging system 612 may be configured to log information associated with the user activity and/or generate the first plurality of sets of event information associated with the first plurality of events. In some examples, the logging system 612 may output training data 616 to a machine learning training system 602. The machine learning training system 602 may be configured to use the training data 616 to train an accidental click prediction model 604 (e.g., an accidental click prediction auxiliary model), such as the first machine learning model 564, and/or a click prediction model 618, such as the second machine learning model 582. In some examples, the training data 616 may comprise the first plurality of sets of event information. Alternatively and/or additionally, the training data 616 may comprise the first training data 560 for use in training the accidental click prediction model 604. In some examples, the accidental click prediction model 604 may be used to generate accidental click predictions 608 (indicative of the plurality of accidental click probabilities 578, for example). The accidental click predictions 608 may be used to train the click prediction model 618. In some examples, model data 620 of the click prediction model 618 may be loaded into a content serving system 624 (e.g., an advertisement serving system). In some examples, content data 610 (e.g., advertisement data) may be received by the content serving system 624 from a content inventory 606 (e.g., an advertisement inventory), such as a data store that stores content items (e.g., advertisements) and/or information (e.g., content item information) associated with the content items. In some examples, the content serving system 624 may use the click prediction model 618 to determine click probabilities associated with presenting content items via client devices. For example, the content serving system 624 may select content items for presentation via client devices based upon the click probabilities determined using the click prediction model 618. The content serving system 624 may transmit content 622 (e.g., one or more rendered content items, such as one or more rendered advertisements) to one or more client devices 628, such as in response to selecting the one or more content items for presentation via the one or more client devices 628.

Although various examples of the present disclosure are described with respect to selection and/or presentation of content items comprising advertisements, embodiments are contemplated in which the content items comprise any type of content, such as at least one of search results, audio (e.g., songs, podcasts, etc.), video (e.g., movies, shows, video clips, etc.), articles, social media feeds, suggested content (e.g., links to videos, audio, articles, social media feeds, etc.), etc. while staying within the scope of the present disclosure.

Implementation of at least some of the disclosed subject matter may lead to benefits including, but not limited to, more accurate determination of click probabilities associated with content items (e.g., as a result of determining accidental click probabilities associated with the second plurality of events, as a result of determining the click probabilities based upon the accidental click probabilities, such as by way of training the second machine learning model 596 using the accidental click probabilities and/or determining the click probabilities using the second machine learning model 596, etc.). The more accurate determination of click probabilities may also lead to a more accurate and/or appropriate selection of a content item for presentation via a client device that has a higher probability of resulting in the content item being selected and/or a higher probability of a user consuming the content item to have an interest in the content item.

Alternatively and/or additionally, implementation of at least some of the disclosed subject matter may lead to benefits including an increase in generalized revenue for presenting content items via client devices (e.g., as a result of the more accurate determination of click probabilities, etc.).

Alternatively and/or additionally, implementation of at least some of the disclosed subject matter may lead to a more accurate and/or appropriate selection of a content item for presentation via a client device that has a higher probability of resulting in the content item being selected and/or a higher probability of a user consuming the content item to have an interest in the content item (e.g., as a result of the more accurate determination of click probabilities, etc.).

Alternatively and/or additionally, implementation of at least some of the disclosed subject matter may lead to benefits including a reduction in screen space and/or an improved usability of a display (e.g., of the client device) (e.g., as a result of the higher probability of the user consuming the content item to have an interest in the content item, wherein the user may not view content that the user does not have an interest in, wherein the user may not need to open a separate application and/or a separate window in order to find content having the subject matter that the user has an interest in, etc.).

Alternatively and/or additionally, implementation of at least some of the disclosed subject matter may lead to benefits including a reduction in bandwidth (e.g., as a result of reducing a need for the user to open a separate application and/or a separate window in order to search throughout the internet and/or navigate through internet content to find content that the user has an interest in).

In some examples, at least some of the disclosed subject matter may be implemented on a client device, and in some examples, at least some of the disclosed subject matter may be implemented on a server (e.g., hosting a service accessible via a network, such as the Internet).

Figure 7:
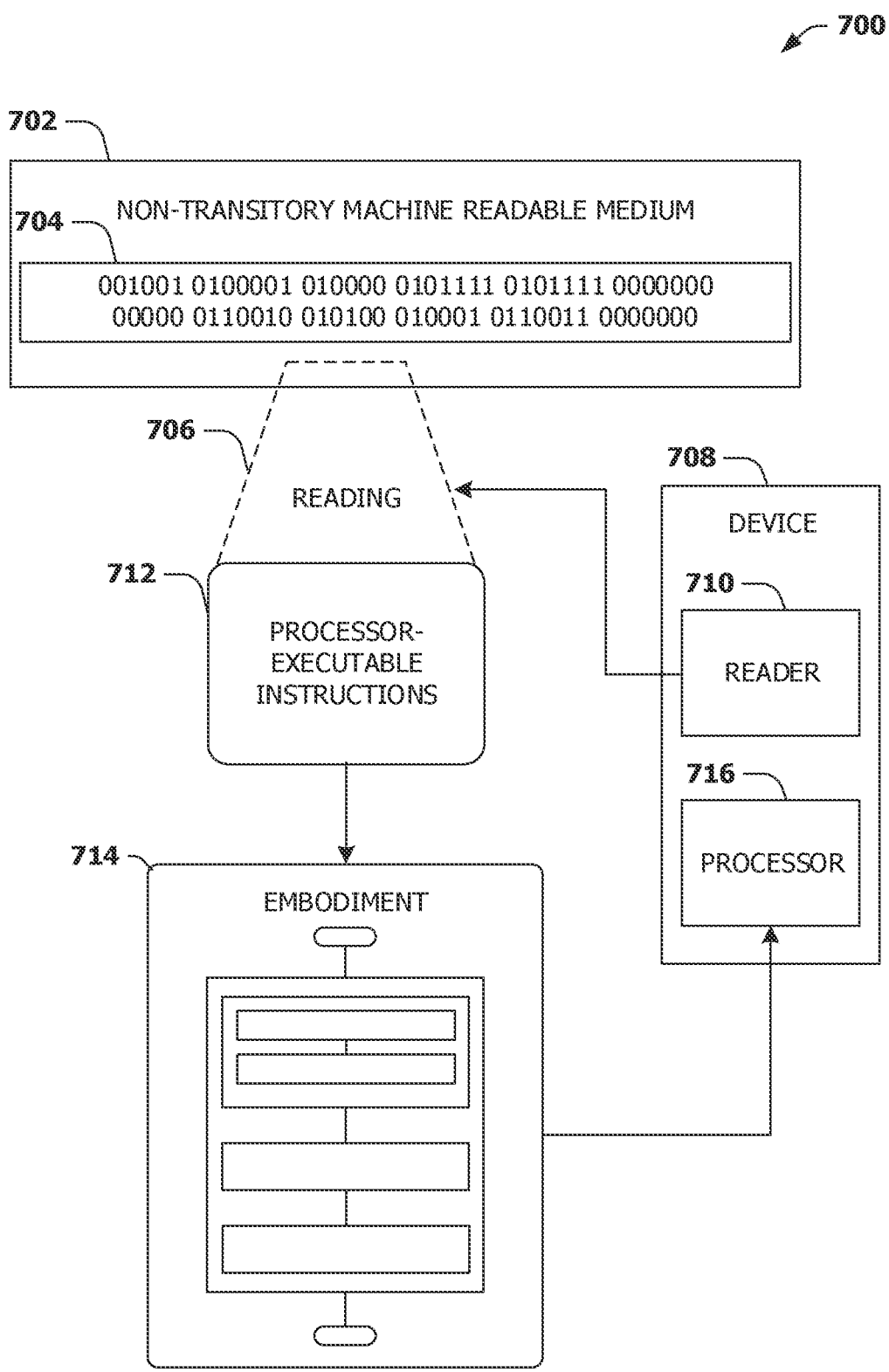
FIG. 7 is an illustration of a scenario featuring an example non-transitory machine readable medium in accordance with one or more of the provisions set forth herein.

FIG. 7 is an illustration of a scenario 700 involving an example non-transitory machine readable medium 702. The non-transitory machine readable medium 702 may comprise processor-executable instructions 712 that when executed by a processor 716 cause performance (e.g., by the processor 716) of at least some of the provisions herein (e.g., embodiment 714). The non-transitory machine readable medium 702 may comprise a memory semiconductor (e.g., a semiconductor utilizing static random access memory (SRAM), dynamic random access memory (DRAM), and/or synchronous dynamic random access memory (SDRAM) technologies), a platter of a hard disk drive, a flash memory device, or a magnetic or optical disc (such as a compact disc (CD), digital versatile disc (DVD), or floppy disk). The example non-transitory machine readable medium 702 stores computer-readable data 704 that, when subjected to reading 706 by a reader 710 of a device 708 (e.g., a read head of a hard disk drive, or a read operation invoked on a solid-state storage device), express the processor-executable instructions 712. In some embodiments, the processor-executable instructions 712, when executed, cause performance of operations, such as at least some of the example method 400 of FIG. 4, for example. In some embodiments, the processor-executable instructions 712 are configured to cause implementation of a system, such as at least some of the example system 501 of FIGS. 5A-5M and/or the example system 601 of FIG. 6, for example.

3. Usage of Terms

As used in this application, "component," "module," "system", "interface", and/or the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Unless specified otherwise, "first," "second," and/or the like are not intended to imply a temporal aspect, a spatial aspect, an ordering, etc. Rather, such terms are merely used as identifiers, names, etc. for features, elements, items, etc. For example, a first object and a second object generally correspond to object A and object B or two different or two identical objects or the same object.

Moreover, "example" is used herein to mean serving as an instance, illustration, etc., and not necessarily as advantageous. As used herein, "or" is intended to mean an inclusive "or" rather than an exclusive "or". In addition, "a" and "an" as used in this application are generally be construed to mean "one or more" unless specified otherwise or clear from context to be directed to a singular form. Also, at least one of A and B and/or the like generally means A or B or both A and B. Furthermore, to the extent that "includes", "having", "has", "with", and/or variants thereof are used in either the detailed description or the claims, such terms are intended to be inclusive in a manner similar to the term "comprising".

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing at least some of the claims.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, many modifications may be made to this configuration without departing from the scope or spirit of the claimed subject matter.

Various operations of embodiments are provided herein. In an embodiment, one or more of the operations described may constitute computer readable instructions stored on one or more computer and/or machine readable media, which if executed will cause the operations to be performed. The order in which some or all of the operations are described should not be construed as to imply that these operations are necessarily order dependent. Alternative ordering will be appreciated by one skilled in the art having the benefit of this description. Further, it will be understood that not all operations are necessarily present in each embodiment provided herein. Also, it will be understood that not all operations are necessary in some embodiments.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure. In addition, while a particular feature of the disclosure may have been disclosed with respect to only one of several implementations, such feature may be combined with one or more other features of the other implementations as may be desired and advantageous for any given or particular application.

What is claimed is:

1. A method, comprising:
   identifying a first plurality of sets of event information associated with a first plurality of events, wherein the first plurality of sets of event information comprises:
      a second plurality of sets of event information associated with a plurality of intentional click events of the first plurality of events;
      a third plurality of sets of event information associated with a plurality of accidental click events of the first plurality of events; and
      a fourth plurality of sets of event information associated with a plurality of skip events of the first plurality of events;
   determining a plurality of accidental click probabilities associated with a second plurality of events comprising the plurality of accidental click events and the plurality of skip events, wherein the determining the plurality of accidental click probabilities comprises:
      determining a first accidental click probability, associated with a first accidental click event of the plurality of accidental click events, based upon a first set of event information associated with the first accidental click event; and
      determining a second accidental click probability, associated with a first skip event of the plurality of skip events, based upon a second set of event information associated with the first skip event;
   performing machine learning model training, using the first plurality of sets of event information associated with the first plurality of events and a first plurality of labels associated with the first plurality of events, to generate a first machine learning model, wherein:
      the first plurality of labels comprises a second plurality of labels associated with the plurality of intentional click events and a third plurality of labels associated with the second plurality of events;
      labels of the second plurality of labels correspond to an intentional click classification; and
      labels of the third plurality of labels are based upon the plurality of accidental click probabilities and comprise:
         a first label, associated with the first accidental click event, based upon the first accidental click probability; and a second label, associated with the first skip event, based upon the second accidental click probability;

receiving a request for content associated with a client device;

responsive to receiving the request for content, determining a plurality of click probabilities associated with a plurality of content items using the first machine learning model; and selecting, based upon the plurality of click probabilities, a first content item of the plurality of content items for presentation via the client device.

2. The method of claim 1, wherein:

the determining the plurality of accidental click probabilities is performed using a second machine learning model.

3. The method of claim 2, comprising:

performing machine learning model training, using a fifth plurality of sets of event information associated with a second plurality of accidental click events and a sixth plurality of sets of event information associated with a second plurality of skip events, to generate the second machine learning model.

4. The method of claim 1, wherein the determining the plurality of click probabilities comprises:

determining a first click probability associated with the first content item, using the first machine learning model, based upon at least one of client information associated with the client device, content item information associated with the first content item or internet resource information associated with an internet resource associated with the request for content.

5. The method of claim 1, comprising:

presenting a second content item, via a second client device, on a first internet resource, wherein the second content item is selected via the second client device during the presenting the second content item; and detecting occurrence of the first accidental click event based upon a determination that a dwell time associated with the selection of the second content item is less than a threshold dwell time, wherein the dwell time comprises a time during which a second internet resource, accessed by the second client device responsive to the selection of the second content item, is presented via the second client device.

6. The method of claim 5, comprising:

determining the dwell time based upon a first time and a second time, wherein:

the first time corresponds to at least one of:

a time at which the second content item is selected via the second client device; or a time at which the second internet resource is accessed responsive to the selection of the second content item; and the second time corresponds to at least one of:

a time at which the second client device returns to the first internet resource after the second content item is selected; or a time at which the second client device leaves the second internet resource.

7. The method of claim 1, comprising:

presenting a second content item, via a second client device, on a first internet resource; and detecting occurrence of the first skip event based upon a determination that the second content item is not selected via the second client device during the presenting the second content item.

8. The method of claim 7, wherein:

the second accidental click probability is representative of a probability that presentation of the second content item via the second client device would be followed by occurrence of an accidental click event.

9. The method of claim 1, comprising:

presenting a second content item, via a second client device, on a first internet resource, wherein the second content item is selected via the second client device during the presenting the second content item; and detecting occurrence of a first intentional click event of the plurality of intentional click events based upon a determination that a dwell time associated with the selection of the second content item exceeds a threshold dwell time, wherein the dwell time comprises a time during which a second internet resource, accessed by the second client device responsive to the selection of the second content item, is presented via the second client device.

10. The method of claim 1, wherein:

each label of the second plurality of labels is equal to a value associated with the intentional click classification.

11. The method of claim 1, comprising:

determining one or more features associated with the request for content, wherein the determining the plurality of click probabilities using the first machine learning model is performed based upon the one or more features.

12. The method of claim 1, wherein:

the plurality of click probabilities comprises a first click probability associated with the first content item; and the first click probability is representative of a probability of receiving a selection of the first content item responsive to presenting the first content item via the client device.

13. A computing device comprising:

a processor; and memory comprising processor-executable instructions that when executed by the processor cause performance of operations, the operations comprising:

identifying a first plurality of sets of event information associated with a first plurality of events, wherein the first plurality of sets of event information comprises:

a second plurality of sets of event information associated with a plurality of intentional click events of the first plurality of events; and a third plurality of sets of event information associated with a plurality of skip events of the first plurality of events;

determining a plurality of accidental click probabilities associated with the plurality of skip events, wherein the determining the plurality of accidental click probabilities comprises determining a first accidental click probability, associated with a first skip event of the plurality of skip events, based upon a first set of event information associated with the first skip event;

performing machine learning model training, using the first plurality of sets of event information associated with the first plurality of events and a first plurality of labels associated with the first plurality of events, to generate a first machine learning model, wherein:

the first plurality of labels comprises a second plurality of labels associated with the plurality of intentional click events and a third plurality of labels associated with the plurality of skip events;

labels of the second plurality of labels correspond to an intentional click classification; and
labels of the third plurality of labels are based upon the plurality of accidental click probabilities and comprise a first label, associated with the first skip event, based upon the first accidental click probability;
receiving a request for content associated with a client device;
responsive to receiving the request for content, determining a plurality of click probabilities associated with a plurality of content items using the first machine learning model; and
selecting, based upon the plurality of click probabilities, a first content item of the plurality of content items for presentation via the client device.

14. The computing device of claim 13, wherein:
the determining the plurality of accidental click probabilities is performed using a second machine learning model.

15. The computing device of claim 14, the operations comprising:
performing machine learning model training, using a fourth plurality of sets of event information associated with a plurality of accidental click events and a fifth plurality of sets of event information associated with a second plurality of skip events, to generate the second machine learning model.

16. The computing device of claim 15, the operations comprising:
presenting a second content item, via a second client device, on a first internet resource, wherein the second content item is selected via the second client device during the presenting the second content item; and
detecting occurrence of a first accidental click event of the plurality of accidental click events based upon a determination that a dwell time associated with the selection of the second content item is less than a threshold dwell time, wherein the dwell time comprises a time during which a second internet resource, accessed by the second client device responsive to the selection of the second content item, is presented via the second client device.

17. The computing device of claim 13, wherein the determining the plurality of click probabilities comprises:
determining a first click probability associated with the first content item, using the first machine learning model, based upon at least one of client information associated with the client device, content item information associated with the first content item or internet resource information associated with an internet resource associated with the request for content.

18. The computing device of claim 13, the operations comprising:
presenting a second content item, via a second client device, on a first internet resource, wherein the second content item is selected via the second client device during the presenting the second content item; and
detecting occurrence of a first intentional click event of the plurality of intentional click events based upon a determination that a dwell time associated with the selection of the second content item exceeds a threshold dwell time, wherein the dwell time comprises a time during which a second internet resource, accessed by the second client device responsive to the selection of the second content item, is presented via the second client device.

19. A non-transitory machine readable medium having stored thereon processor-executable instructions that when executed cause performance of operations, the operations comprising:
identifying a first plurality of sets of event information associated with a first plurality of events, wherein the first plurality of sets of event information comprises:
a second plurality of sets of event information associated with a plurality of intentional click events of the first plurality of events; and
a third plurality of sets of event information associated with a plurality of accidental click events of the first plurality of events;
determining a plurality of accidental click probabilities associated with the plurality of accidental click events, wherein the determining the plurality of accidental click probabilities comprises determining a first accidental click probability, associated with a first accidental click event of the plurality of accidental click events, based upon a first set of event information associated with the first accidental click event;
performing machine learning model training, using the first plurality of sets of event information associated with the first plurality of events and a first plurality of labels associated with the first plurality of events, to generate a first machine learning model, wherein:
the first plurality of labels comprises a second plurality of labels associated with the plurality of intentional click events and a third plurality of labels associated with the plurality of accidental click events;
labels of the second plurality of labels correspond to an intentional click classification; and
labels of the third plurality of labels are based upon the plurality of accidental click probabilities and comprise a first label, associated with the first accidental click event, based upon the first accidental click probability;
receiving a request for content associated with a client device;
responsive to receiving the request for content, determining a plurality of click probabilities associated with a plurality of content items using the first machine learning model; and
selecting, based upon the plurality of click probabilities, a first content item of the plurality of content items for presentation via the client device.

20. The non-transitory machine readable medium of claim 19, wherein the determining the plurality of click probabilities comprises:
determining a first click probability associated with the first content item, using the first machine learning model, based upon at least one of client information associated with the client device, content item information associated with the first content item or internet resource information associated with an internet resource associated with the request for content.

* * * * *